(12) United States Patent
Wu et al.

(10) Patent No.: US 12,123,301 B2
(45) Date of Patent: Oct. 22, 2024

(54) ITERATIVE CLUSTERING FOR GEOSTEERING INVERSION

(71) Applicant: Halliburton Energy Services, Inc., Houston, TX (US)

(72) Inventors: Hsu-Hsiang Wu, Houston, TX (US); Li Pan, Houston, TX (US); Ting Yan, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 451 days.

(21) Appl. No.: 17/575,173

(22) Filed: Jan. 13, 2022

(65) Prior Publication Data

US 2023/0220768 A1    Jul. 13, 2023

(51) Int. Cl.
| | |
|---|---|
| *E21B 49/00* | (2006.01) |
| *E21B 7/04* | (2006.01) |
| *E21B 44/00* | (2006.01) |
| *E21B 47/18* | (2012.01) |
| *E21B 49/08* | (2006.01) |
| *G01V 3/20* | (2006.01) |
| *G01V 3/30* | (2006.01) |
| *G01V 3/38* | (2006.01) |

(52) U.S. Cl.
CPC .............. *E21B 49/003* (2013.01); *E21B 7/04* (2013.01); *E21B 44/00* (2013.01); *E21B 47/18* (2013.01); *E21B 49/087* (2013.01); *G01V 3/20* (2013.01); *G01V 3/30* (2013.01); *G01V 3/38* (2013.01); *E21B 2200/20* (2020.05)

(58) Field of Classification Search
CPC ........................................................ G01V 3/20
See application file for complete search history.

(56) References Cited

U.S. PATENT DOCUMENTS

| | | | |
|---|---|---|---|
| 2016/0315800 A1* | 10/2016 | AlShaikh | ................ H04L 43/10 |
| 2021/0293133 A1* | 9/2021 | Panchal | .................... E21B 7/04 |
| 2023/0017966 A1* | 1/2023 | Skoff | ....................... E21B 44/00 |
| 2023/0193751 A1* | 6/2023 | Li | ........................... E21B 49/00 |
| | | | 703/11 |

* cited by examiner

*Primary Examiner* — Nathan L Laughlin
(74) *Attorney, Agent, or Firm* — Benjamin Ford; C. Tumey Law Group, PLLC

(57) ABSTRACT

System and methods for geosteering inversion are provided. Downhole tool responses are predicted for different points along a planned path of a wellbore during a downhole operation, based on each of a plurality of inversion models. Measurements of the downhole tool's actual responses are obtained as the wellbore is drilled over the different points during a current stage of the operation. The inversion models are clustered based on a comparison between the actual and predicted tool responses and a randomly selected centroid for each cluster. The inversion models are re-clustered using an average inversion model determined for each cluster as the centroid for that cluster. At least one of the re-m clustered inversion models is used to perform inversion for one or more subsequent stages of the downhole operation along the planned wellbore path. The planned wellbore path is adjusted for the subsequent stage(s) of the downhole operation.

20 Claims, 12 Drawing Sheets

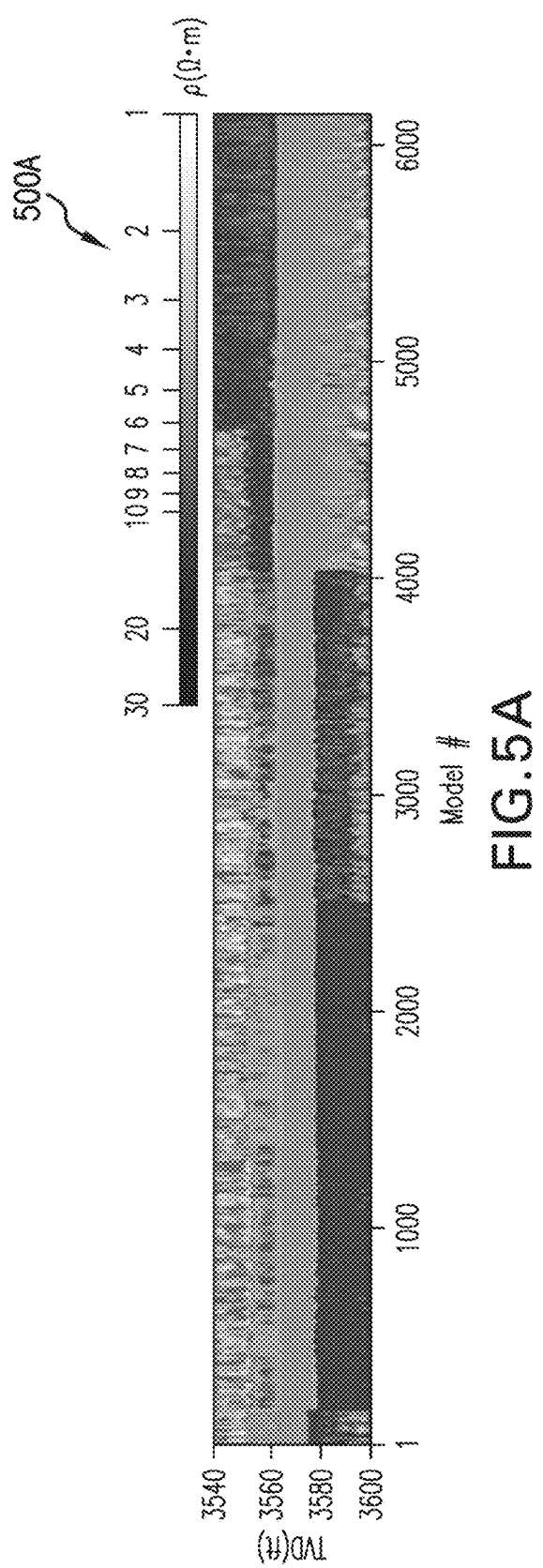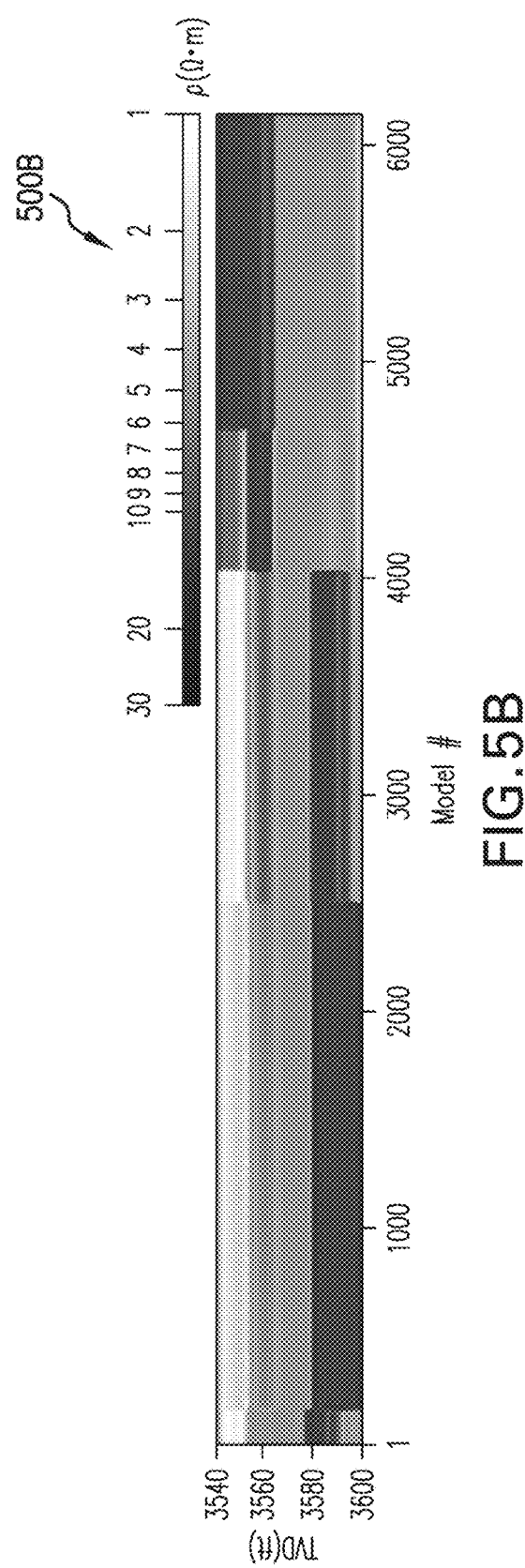
FIG.5A
FIG.5B

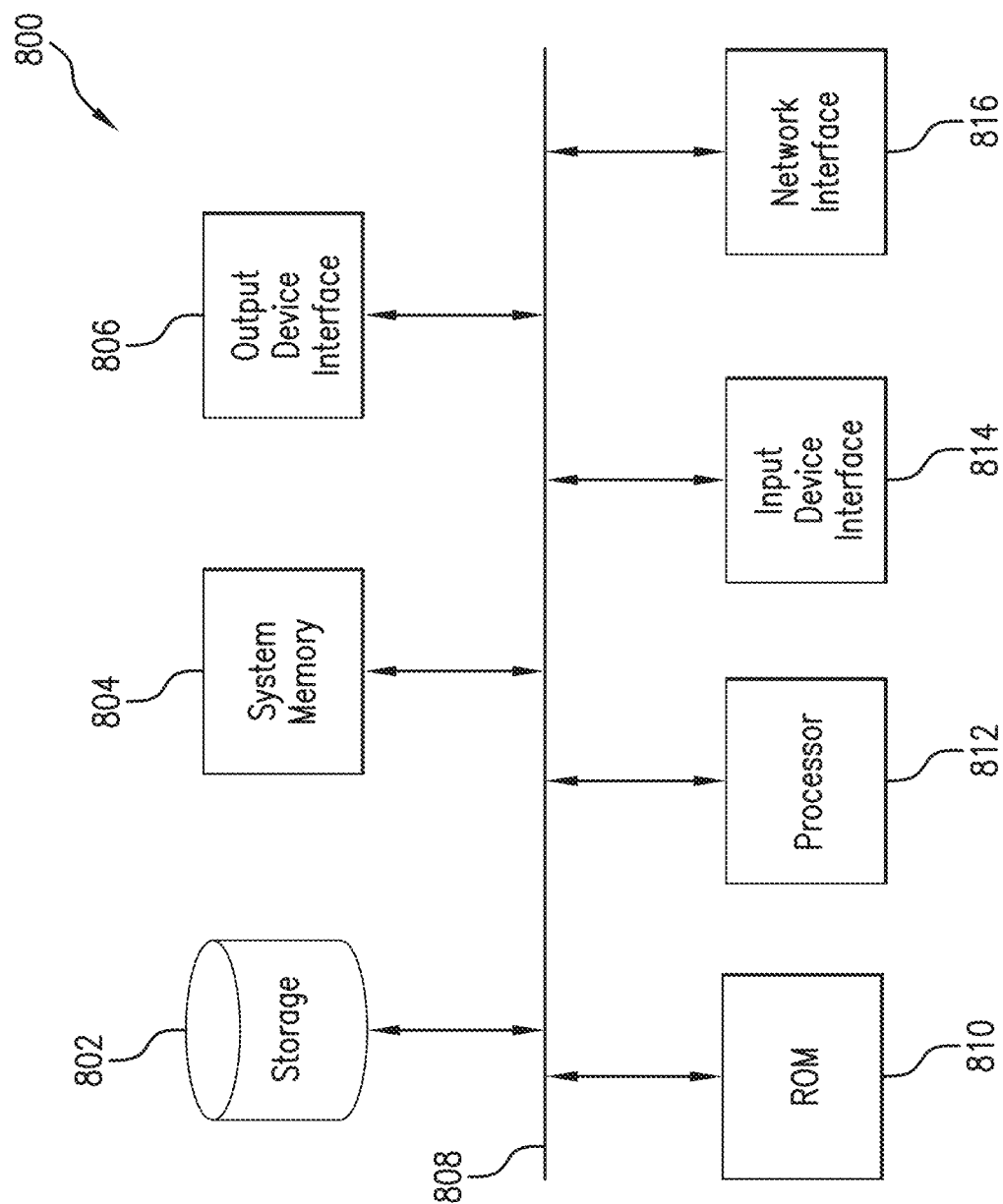

ITERATIVE CLUSTERING FOR GEOSTEERING INVERSION

FIELD OF THE DISCLOSURE

The present disclosure relates generally to hydrocarbon exploration and production, and particularly, to electromagnetic resistivity inversion techniques for directional drilling and wellbore placement for hydrocarbon exploration and production.

BACKGROUND

In the field of hydrocarbon exploration and production, downhole logging tools are typically used to provide an indication of the properties of rock formations surrounding a wellbore as it is drilled through the formations. An example of such a downhole logging tool is an electromagnetic (EM) resistivity logging tool. An EM resistivity logging tool typically includes at least one transmitting antenna and multiple receiving antennas located at different distances from the transmitting antenna along the axis of the tool. The transmitting antenna is used to generate EM fields in the surrounding formation. In turn, the EM fields in the formation induce a voltage in each receiving antenna. The response of the formation is converted into a set of inversion parameters, which are then used to estimate various properties of the formation. Such information is useful in ascertaining the presence or absence of fluids, such as hydrocarbons.

Inversion can be performed on a point-by-point basis during downhole logging operations. To deal with formation heterogeneity, such as shoulder-bed effects from formation layer boundaries, a "one-dimensional" (1D) inversion may be performed to determine an appropriate layered formation model that matches the measurements acquired by the downhole tool from at least a single point. In some cases, multiple inversion models representing multiple initial guesses of formation properties may be generated and an average of the inversion results produced by the models may be used to estimate formation properties. The inversion models may be clustered and used to estimate properties for different layers of the formation. Conventional clustering techniques typically rely on random selection for assigning models to clusters. Consequently, such techniques may fail to account for unwanted noise in the model data and produce clusters of inversion models that are less than optimal.

BRIEF DESCRIPTION OF THE DRAWINGS

FIG. 5A is a plot of inversion results produced by the inversion models of FIG. 4C after applying K-means clustering.

FIG. 5B is a plot of computed averages of the inversion results for the respective inversion model clusters in FIG. 5A.

FIG. 8 is a block diagram of an illustrative computer system in which embodiments of the present disclosure may be implemented.

DESCRIPTION OF ILLUSTRATIVE EMBODIMENTS

Figure 1A:
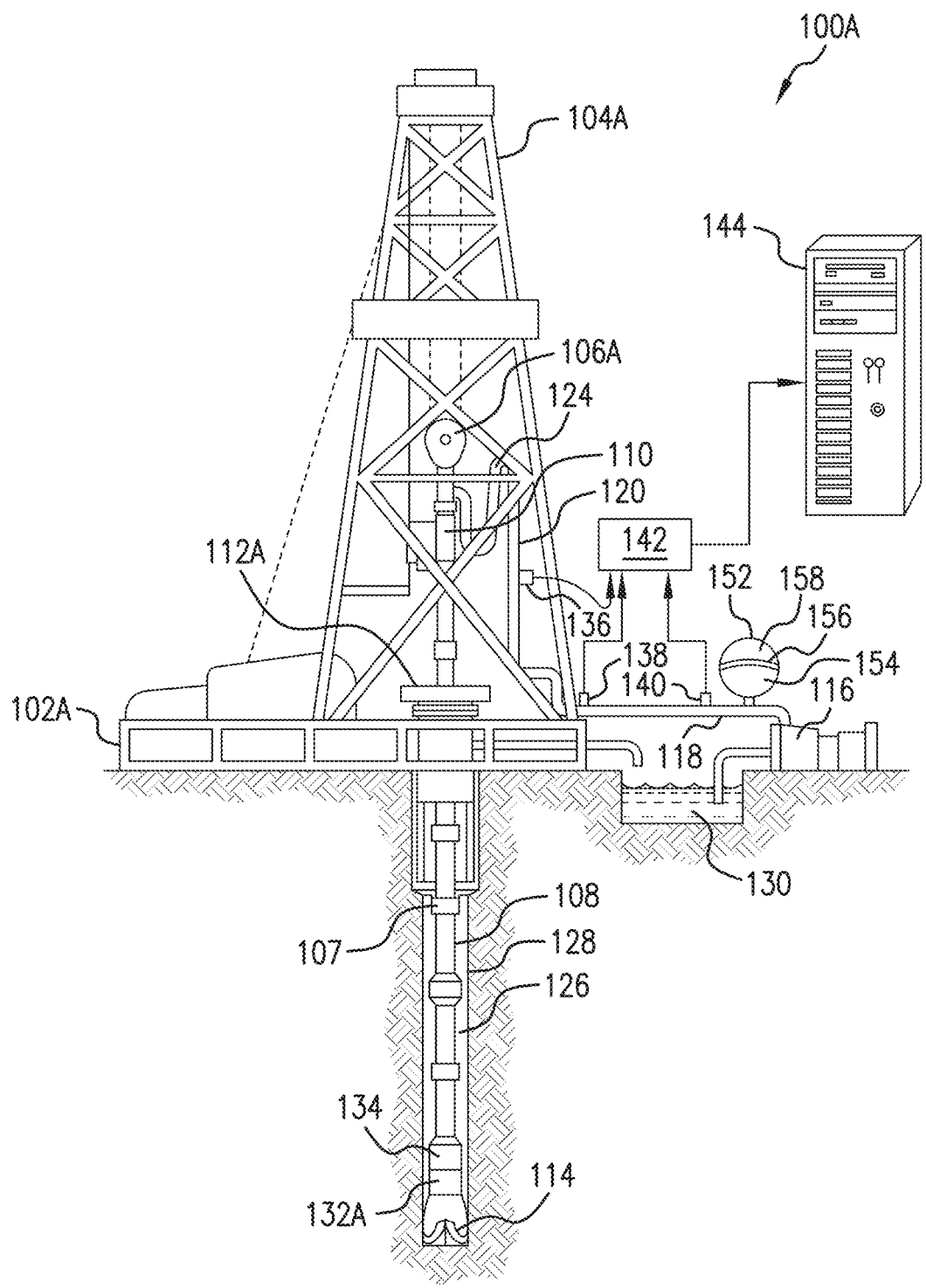
FIG. 1A is a diagram of an illustrative drilling system including a logging tool for performing a downhole operation at a well site.

Embodiments of the present disclosure relate to iteratively clustering inversion models for well planning and control during downhole operations. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. It would also be apparent to one of skill in the relevant art that the disclosed inversion techniques may be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

As will be described in further detail below, embodiments of the present disclosure may be used as part of a geosteering service for performing different stages of a downhole operation within a subsurface reservoir formation. Such a downhole operation may be, for example, a drilling operation involving drilling a wellbore along a planned path toward a target zone of hydrocarbon deposits within the formation. The different stages of the drilling operation may correspond to different operating intervals in which the wellbore is drilled along the planned path through one or more layers of the formation. Each operating interval may be, for example, a different range of depth or time over which a portion of the wellbore is drilled along the planned path. During each operating interval or stage of the downhole operation, a downhole tool disposed within the wellbore may be used to measure properties of the surrounding formation as the wellbore is drilled along its planned path. Such measurements may be collected by the downhole tool at one or more of a plurality of is logging points along the path of the wellbore as it is drilled over different stages of the downhole operation. The downhole tool may be, for example, an electromagnetic (EM) resistivity logging tool for measuring the formation's resistivity at each logging point along the wellbore's path. However, it should be noted that embodiments of the present disclosure are not intended to be limited thereto and that other types of downhole tools, e.g., acoustic or ultrasonic tools, may also be used. Further, it should be noted that such other tools may be used to measure additional formation properties, e.g., formation resistivity, formation anisotropy, formation dip, formation permeability, formation permittivity, etc.

In one or more embodiments, a plurality of inversion models for performing inversion during each stage of the downhole operation may be selected from an initial set of formation models. Each of the initial models may be, for example, a multi-layer formation model that is generated by randomly sampling different sets of model parameters representing different formation properties for multiple formation layers, e.g., based on a predefined range of parameters within some probability distribution. Each formation model may therefore be defined by a different set of model parameters and represent a different set of formation properties. The formation models that are selected from the initial set as inversion models may be used to predict responses of the downhole tool (e.g., formation resistivities) for different points along the planned path of the wellbore during a current stage of the downhole operation. The inversion models may represent, for example, multiple initial guesses of formation properties for multiple layers of the formation. Accordingly, the inversion models (or initial guesses) may be qualified or disqualified for performing geosteering inversion during subsequent stages of the downhole operation along the planned path of the wellbore through the formation. The qualification of the formation and inversion models may involve comparing the predicted responses of the downhole tool based on each formation model or inversion model with the tool's actual responses based on measurements collected by the tool at each of the different points along the planned wellbore path. The results of the comparison may then be used to select only those models that produce a predicted response that meets at least one misfit criterion. The misfit criterion may be, for example, a threshold value representing an acceptable or tolerable amount of deviation between the tool's actual and predicted response. Any initial model having a misfit value that does not meet the misfit criterion, e.g., having a misfit value at or above a given misfit threshold or error tolerance, may be disqualified and removed from the set of models selected for performing inversion. The disqualified models may represent noise that can be discarded from the modeled dataset. In some implementations, standardization, e.g., via a standard scaler function, and principal component analysis (PCA) techniques may be applied to the qualified inversion models to reduce their dimensionality and thereby reduce the complexity of the associated model data.

The inversion models may then be clustered using K-means clustering with a randomly selected model serving as an initial centroid for each cluster. The purpose of the clustering may be to group together similar inversion models, i.e., models having a similar set of parameters or representing a similar set of formation properties or characteristics. It should be appreciated that the inversion models may be clustered into any number of clusters and that any of various well-known statistical techniques may be used as desired for randomly selecting the cluster centroids. The clustering of inversion models may involve, for example: (1) computing the Euclidean distance between each inversion model and the selected cluster centroids; (2) assigning each inversion model to the closest cluster (i.e., the cluster for which the difference between the inversion model and corresponding cluster centroid is least); and (3) determining an average inversion model for each cluster, which represents the average of all inversion models assigned to that cluster. Once the inversion models have been clustered, the centroid for each cluster may be updated by replacing the initial centroid with the average inversion model determined for that cluster. Accordingly, the new centroid for each cluster may be an inversion model that represents an average of the inversion models assigned to that cluster.

In one or more embodiments, the clustered inversion models may be re-clustered using a modified K-means clustering technique in which the average inversion model determined for each cluster serves as the new centroid for that cluster. One or more of the re-clustered inversion models may then be used to perform inversion for one or more subsequent stages of the downhole operation. Further, the planned path of the wellbore may be adjusted based on the inversion results produced by the re-clustered inversion models, and the subsequent stage(s) of the downhole operation may be performed along the adjusted path of the wellbore.

By using the average inversion model as the centroid for each cluster, the modified K-means clustering technique disclosed herein may provide more accurate results is with relatively less error in the clustering process for the inversion models. The average inversion model serves as a better centroid than one that is randomly selected. This enhances the convergency of the clustering results and produces a better clustering result overall.

Illustrative embodiments and related methodologies of the present disclosure will be described below with reference to FIGS. 1A-8, for example, as they might be employed in a computer system of a surface control unit of a drilling rig at a well site for automated well planning and control. As will be described in further detail below, such a well planning and control system may be used to perform the disclosed inversion techniques for purposes of geosteering a wellbore through different layers of a subsurface formation. Other features and advantages of the disclosed embodiments will be or will become apparent to one of ordinary skill in the art upon examination of the following figures and detailed description. It is intended that all such additional features and advantages be included within the scope of the disclosed embodiments.

Further, the illustrated figures are only exemplary and are not intended to assert or imply any limitation with respect to the environment, architecture, design, or process in which different embodiments may be implemented. Even though a figure may depict a vertical wellbore, unless indicated otherwise, it should be understood by one of ordinary skill in the art that the apparatus according to the present disclosure is equally well suited for use in wellbores having other orientations including horizontal wellbores, deviated or slanted wellbores, multilateral wellbores or the like. Likewise, unless otherwise noted, even though a figure may depict an onshore operation, it should be understood by those skilled in the art that the apparatus according to the present disclosure is equally well suited for use in offshore operations and vice-versa. Further, unless otherwise noted, even though a figure may depict a cased hole, it should be understood by one of ordinary skill in the art that the apparatus according to the present disclosure is equally well suited for use in open hole operations.

FIG. 1A is a diagram of an illustrative drilling system 100A including a logging tool for performing a downhole operation at a well site. As shown in FIG. 1A, system 100A includes a drilling platform 102 located at the surface of a borehole or wellbore 126. Wellbore 126 is drilled into different layers of a subsurface rock formation using a drill string 108 that includes a string of drill pipes connected together by "tool" joints 107. Drilling is platform 102A is equipped with a derrick 104A that supports a hoist 106A. Hoist 106A suspends a top drive 110 that is used to lower drill string 108 through a wellhead 112A and rotate drill string 108 within wellbore 126. Connected to the lower portion or distal end of drill string 108 is a bottom hole assembly (BHA), which includes a drill bit 114, at least one downhole tool 132A, and a telemetry device 134. It should be appreciated that drill bit 114, downhole tool 132A, and telemetry device 134 may be implemented as separate components within a housing of the BHA at the end of drill string 108. Although not shown in FIG. 1A, it should also be appreciated that the BHA may include additional components for supporting various functions related to the drilling operations being conducted. Examples of such components include, but are not limited to, drill collars, stabilizers, reamers, and hole-openers.

Drilling of wellbore 126 occurs as drill bit 114 penetrates the subsurface formation while rotating at the end of drill string 108. Drill bit 114 may be rotated in conjunction with the rotation of drill string 108 by top drive 110. Additionally or alternatively, drill bit 114 may be rotated independently from the rest of drill string 108 by a downhole motor (not shown) positioned near drill bit 114. Although wellbore 126 is shown in FIG. 1A as a vertical wellbore, it should be appreciated that wellbore 126 may be drilled in a non-vertical, horizontal, or near-horizontal direction, e.g., as a deviated well drilled at angles approaching or at 90 degrees from vertical.

Drilling fluid may be pumped at high pressures and volumes by a mud pump 116 through a flow line 118, a stand pipe 120, a goose neck 124, top drive 110, and drill string 108 to emerge through nozzles or jets in drill bit 114. The drilling fluid emerging from drill bit 114 travels back up wellbore 126 via a channel or annulus formed between the exterior of drill string 108 and a wellbore wall 128. The drilling fluid then goes through a blowout preventer (not specifically shown) and into a mud pit 130 at the surface, where the fluid is cleaned and recirculated by mud pump 116 through drill string 108 and wellbore 126. The drilling fluid may be used for various purposes during the drilling operation including, but not limited to, cooling drill bit 114, carrying cuttings from the base of the bore to the surface, and balancing the hydrostatic pressure in the rock formations.

Downhole tool 132A may be used to collect information related to downhole drilling conditions and surrounding formation properties as wellbore 126 is drilled over is different stages of the drilling operation. Downhole tool 132A may be, for example, a logging-while-drilling (LWD) or a measurement-while-drilling (MWD) tool for measuring such downhole conditions and formation properties. The measured downhole conditions may include, for example and without limitation, the movement, location, and orientation of the BHA or drilling assembly as wellbore 126 is drilled within the formation. Examples of formation properties that may be measured include, but are not limited to, formation resistivity, anisotropy ratio, distance to bed boundary (DTBB), and dip. The formation properties (e.g., formation resistivity) may be measured along a horizontal plane (e.g., horizontal resistivity) or a vertical plane (e.g., vertical resistivity) or both.

In one or more embodiments, downhole tool 132A may be an electromagnetic (EM) resistivity logging tool integrated within a logging section of the BHA. In some implementations, downhole tool 132A may be in the form of a drill collar located immediately before drill bit 114 at a distal end of the BHA. Downhole tool 132A in this example may have an antenna structure including a tilted transmitter coil and two or more tilted receiver coils. The transmitter coil may be configured to transmit look-ahead and/or look-around signals that propagate through different areas of the surrounding rock formation. The receiver coils may be configured to receive the transmitted signal(s). It should be appreciated that the transmitter and receiver coils may be positioned in any of various orientations and tilt angles as desired for a particular implementation. In some implementations, downhole tool 132A may have a designated reference point or location relative to which the tool's current position within wellbore 126 and formation may be measured during the downhole operation. Such a tool reference point may correspond to, for example, the location of drill bit 114 at the distal end of the BHA.

In one or more embodiments, downhole tool 132A may measure a set of formation resistivity values including, but not limited to, a resistivity of a first formation layer, a resistivity of each of one or more second formation layers ahead of the first formation layer, a distance between the first formation layer and the one or more second formation layers, and a resistivity contrast representing a gradient transition of formation resistivity between the first and one or more second formation layers. While only downhole tool 132A is shown in FIG. 1A, it should be appreciated that the disclosed embodiments are not limited thereto and that additional downhole tools may be used.

In one or more embodiments, the information collected by downhole tool 132A may be transmitted to the surface via telemetry device 134. Telemetry device 134 may be part of a communication subsystem of drill string 108. Telemetry device 134 may be communicatively coupled to downhole tool 132A for receiving data related to the formation properties and downhole conditions measured and/or recorded by downhole tool 132A. Telemetry device 134 may transmit the downhole information received from downhole tool 132A to a computer 144 located at the surface of the well site. The information may be transmitted using any suitable communication channel (e.g., pressure pulses within the drilling fluid flowing in drill string 108, acoustic telemetry through the pipes of the drill string 108, electromagnetic telemetry, optical fibers embedded in the drill string 108, or any combination thereof). For example, drilling system 100A may employ mud pulse telemetry for transmitting downhole information collected by downhole tool 132A to the surface during the drilling operation. However, it should be appreciated that embodiments are not limited thereto and that any of various other types of data communication techniques may be used for sending the downhole information to the surface. Such techniques may include, for example and without limitation, wireless communication techniques and wireline or any other type of wired electrical communication techniques.

In the above mud pulse telemetry example, telemetry device 134 may encode the downhole information using a data compression scheme and transmit the encoded data to the surface by modulating the flow of drilling fluid through drill string 108 so as to generate pressure pulses that propagate to the surface. The pressure pulses may be received at the surface by various transducers 136, 138 and 140, which convert the received pulses into electrical signals for a signal digitizer 142 (e.g., an analog to digital converter). While three transducers 136, 138 and 140 are shown in FIG. 1A, greater or fewer numbers of transducers may be used as desired for a particular implementation. Digitizer 142 supplies a digital form of the pressure signals to computer 144.

In one or more embodiments, computer 144 may function as a surface control system of drilling rig 104A for monitoring and controlling downhole operations at the well site. Computer 144 may be implemented using any type of computing device having at least one processor and a memory. Computer 144 may process and decode the digital signals received from digitizer 142 using an appropriate decoding scheme. The resulting decoded telemetry data may be further analyzed and processed by computer 144 to display useful information to a well site operator.

In one or more embodiments, the processing performed by computer 144 may include performing iterative clustering of inversion models for geosteering inversion. The inversion models may be, for example, formation models representing multiple layers of the subsurface formation. The geosteering inversion may be based on any of various numerical optimization techniques (e.g., Gauss-Newton gradient inversion), which may be utilized to invert formation geology to predict responses of downhole tool 132A during different stages of a downhole operation. As will be described in further detail below, the iterative clustering techniques disclosed herein may be used to select optimal inversion models that have similar formation characteristics among the selected models as well as minimize any discrepancy between formation property measurements obtained by downhole tool 132A (i.e., actual responses of downhole tool 132A) and inversion results (i.e., predicted responses) produced by the selected inversion models. The results of the inversion may then be used to make appropriate geosteering decisions for adjusting or optimizing a planned path of wellbore 126 being drilled through the formation, e.g., by steering the BHA and drill bit 114 in a desired direction or toward a predetermined target location within the formation.

It should be appreciated that computer 144 may be located at the surface of the well site, e.g., near drilling rig 104A, or at a remote location from the well site. While not shown in FIG. 1A, computer 144 may be communicatively coupled to one or more other computer systems via a communication network, e.g., a local area, medium area, or wide area network, such as the Internet. Such other computer systems may include remote computer systems located away from the well site for remotely monitoring and controlling well site operations via the communication network.

To reduce noise in the downhole data received at the surface, drilling system 100A may include a dampener or desurger 152 to reduce noise. Flow line 118 couples to a drilling fluid chamber 154 in desurger 152. A diaphragm or separation membrane 156 separates the drilling fluid chamber 154 from a gas chamber 158. Desurger 152 may include a gas chamber 158 filled with nitrogen at a predetermined percentage, e.g., approximately 50% to 75% of the operating pressure of the drilling fluid. The diaphragm 156 moves with variations in the drilling fluid pressure, enabling the gas chamber to expand and contract, is thereby absorbing some of the pressure fluctuations.

In addition to transmitting information collected downhole to the surface, telemetry device 134 may receive information from the surface over one or more of the above-described communication channels. The information received from the surface may include, for example, signals for controlling the operation of the BHA or individual components thereof. Such control signals may be used, for example, to update operating parameters of the BHA for purposes of adjusting a planned trajectory or path of wellbore 126 through the formation during different stages of the drilling operation. In one or more embodiments, the control signals may be representative of commands input by a well site operator for making adjustments to the planned path or controlling various operational variables of the drilling operation as downhole conditions change over time. Examples of such operational variables may include, but are not limited to, weight on bit, drilling fluid flow through the drill pipe, the drill string rotational speed, and the density and viscosity of the drilling fluid.

In one or more embodiments, computer 144 may provide an interface enabling the well site operator at the surface to receive indications of downhole operating conditions and adjust one or more of controllable parameters of the drilling operation accordingly. The interface may be include a display for presenting relevant information, e.g., values of drilling parameters or operational variables, to the operator during the drilling operation as well as a user input device (e.g., a mouse, keyboard, touch-screen, etc.) for receiving input from the operator. For example, computer 144 may enable an operator to select resistivity analysis options, view collected resistivity data, view resistivity analysis results, and/or to perform other relevant tasks during the downhole operation. As downhole operating conditions may continually change over the course of the operation, the operator may use the interface provided by computer 144 to react to such changes in real time by adjusting selected drilling parameters in order to increase and/or maintain drilling efficiency and thereby, optimize the drilling operation.

Figure 1B:
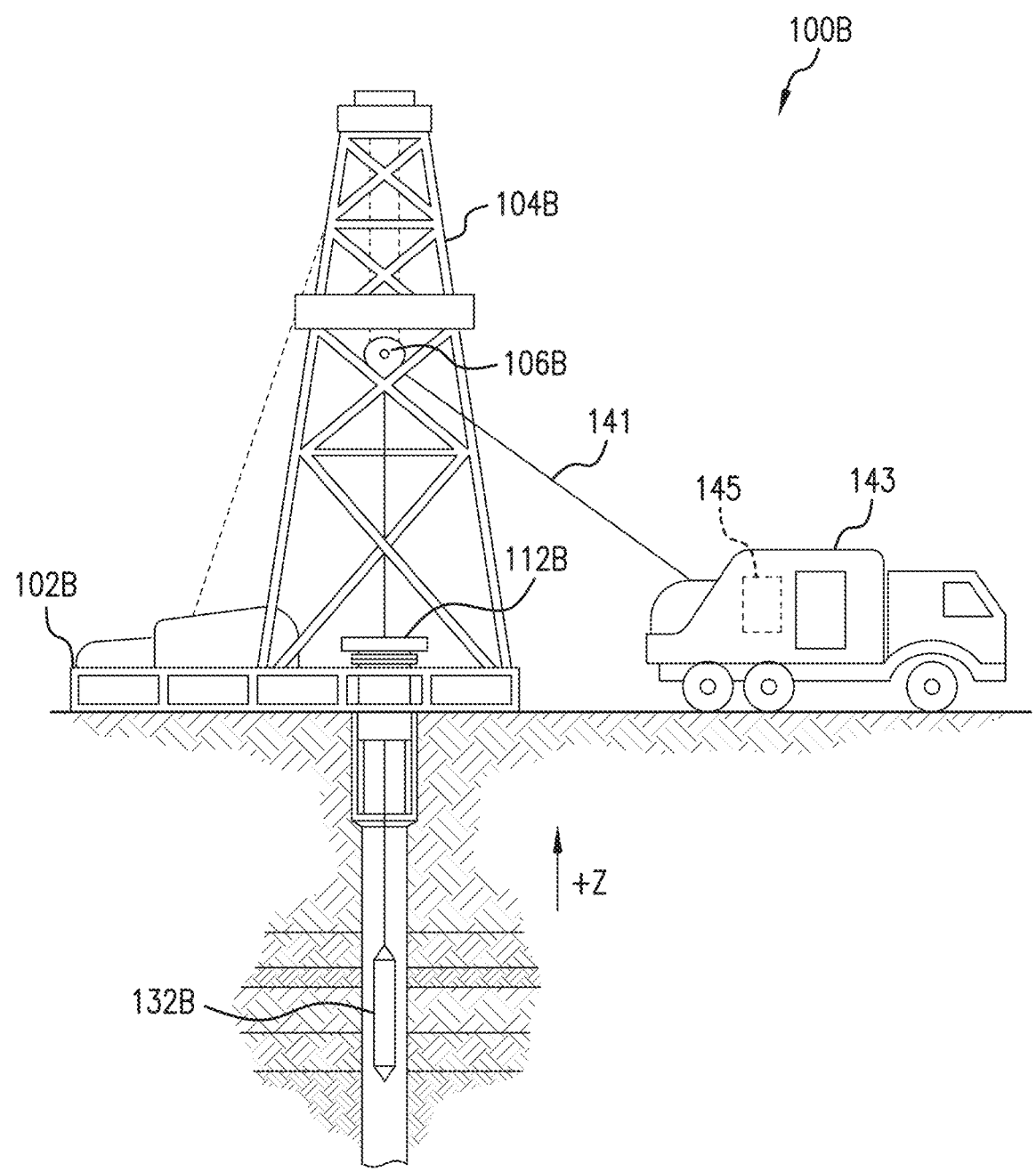
FIG. 1B is a diagram of an illustrative drilling system including a wireline tool for performing a downhole operation at a well site.

FIG. 1B is a diagram of an illustrative drilling system 100B including a downhole tool 132B as an alternative to drilling system 100A including downhole tool 132A of FIG. 1A, as described above, for performing the downhole operation. As shown in FIG. 1B, a drilling platform 102B is equipped with a derrick 104B that supports a hoist 106B. Hoist 106B a cable 141 that is used to lower downhole tool 132B through a wellhead 112B within the wellbore. Downhole tool 132B may be a wireline logging tool for conducting logging operations downhole at various times during the drilling process. For example, a drill string (e.g., drill string 108, as shown in FIG. 1A and described above) may be removed from the wellbore periodically and downhole tool 132B may be inserted for purposes of measuring formation properties in the area surrounding the wellbore at various depths within the formation. Downhole tool 132B in this example may be a logging sonde in the form of an acoustic probe suspended by a cable 141. Cable 141 may have conductors for transporting power to the sonde and telemetry from the sonde to the surface. Downhole tool 132B may have pads and/or centralizing springs to maintain the tool near the axis of the borehole as the tool is pulled uphole. Downhole tool 132B can include a variety of transmitters/receivers for measuring formation resistivity, etc. A logging facility 143 collects resistivity measurements from downhole tool 132B, and includes a computer 145 for processing and storing the resistivity measurements gathered by wireline logging sensors of the logging sonde.

Like computer 144 of FIG. 1A described above, computer 145 may be used for monitoring and controlling downhole operations at the well site. Computer 145 may be implemented using any type of computing device having at least one processor and a memory. Also, like computer 144 of FIG. 1A, the processing performed by computer 145 may include performing iterative clustering of multi-layer inversion models for geosteering inversion, e.g., by steering the wellbore being drilled through the formation along planned path that has been adjusted or optimized based on inversion results, as described above. In one or more embodiments, computer 144 and computer 145 of FIGS. 1A and 1B, respectively, may be used to implement a well planning and control system for downhole operations performed at the respective wellsites. An example of such a well planning and control system will be described in further detail below with respect to FIG. 2.

Figure 2:
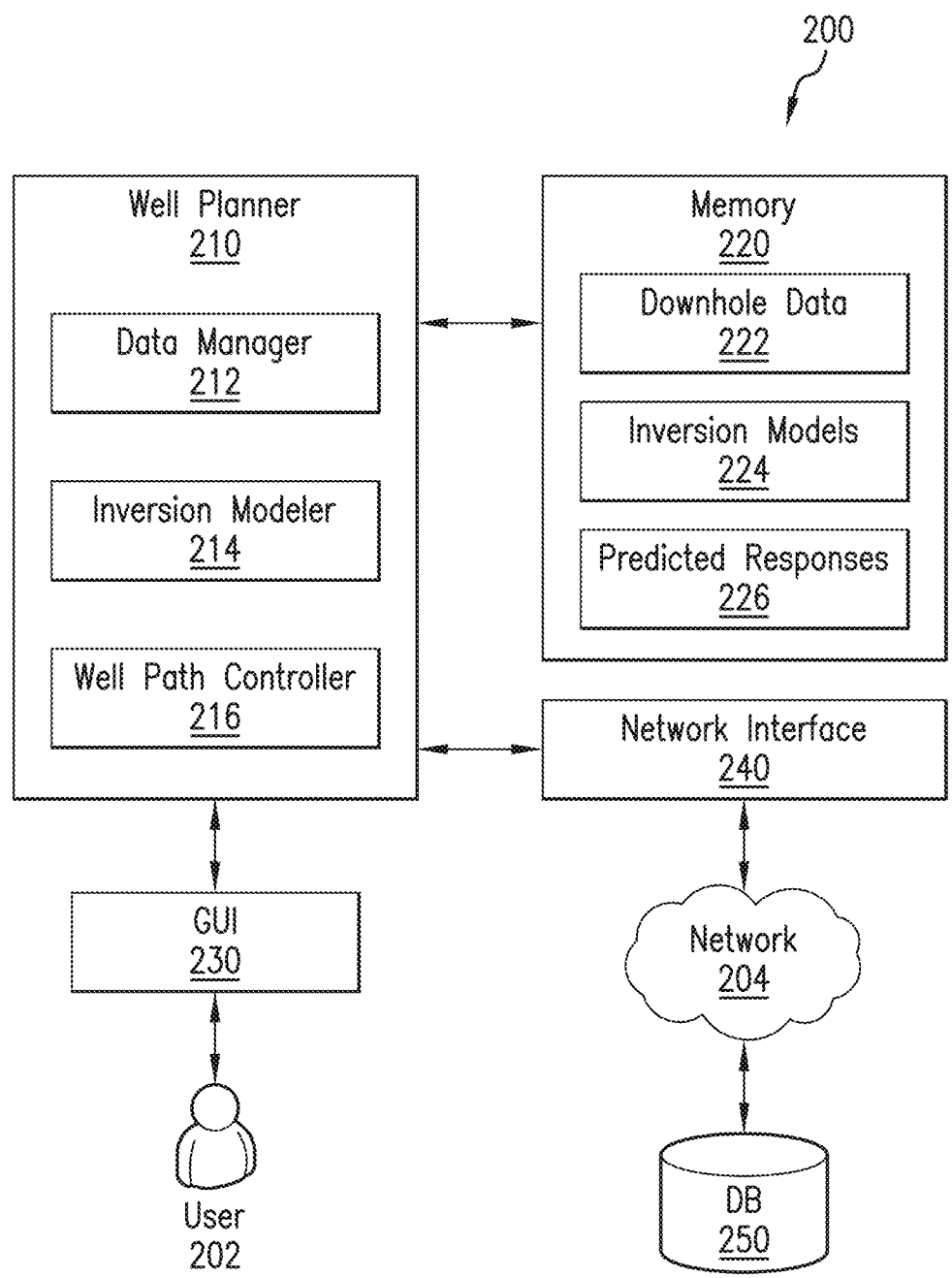
FIG. 2 is a block diagram of an illustrative system for well planning and control using geosteering inversion during downhole operations.

FIG. 2 is a block diagram of an illustrative system 200 for well planning and control using geosteering inversion during a downhole operation at a well site. As shown in FIG. 2, system 200 includes a well planner 210, a memory 220, a graphical user interface (GUI) 230, and a network interface 240. In one or more embodiments, well planner 210, memory 220, GUI 230, and network interface 240 may be communicatively coupled to one another via an internal bus of system 200. Although only well planner 210, memory 220, GUI 230, and network interface 240 are shown in FIG. 2, it should be appreciated that system 200 may include additional components, modules, and/or sub-components as desired for a particular implementation.

System 200 can be implemented using any type of computing device having at least one processor and a processor-readable storage medium for storing data and instructions executable by the processor. Examples of such a computing device include, but are not limited to, a mobile phone, a personal digital assistant (PDA), a tablet computer, a laptop computer, a desktop computer, a workstation, a server, a cluster of computers, a set-top box, or other type of computing device. Such a computing device may also include an input/output (I/O) interface for receiving user input or commands via a user input device (not shown). The user input device may be, for example and without limitation, a mouse, a QWERTY or T9 keyboard, a touch-screen, a graphics tablet, or a microphone. The I/O interface also may be used by the computing device to output or present information via an output device (not shown). The output device may be, for example, a display coupled to or integrated with the computing device for displaying a digital representation of the information being presented to the user. The I/O interface in the example shown in FIG. 2 may be coupled to GUI 230 for receiving input from a user 202 and displaying information and content to user 202 based on the received input. GUI 230 can be any type of GUI display coupled to system 200.

As will be described in further detail below, memory 220 can be used to store information accessible by well planner 210 and any of its components for implementing the functionality of the present disclosure. Memory 220 may be any type of recording medium coupled to an integrated circuit that controls access to the recording medium. The recording medium can be, for example and without limitation, a semiconductor memory, a hard disk, or similar type of memory or storage device. In some implementations, memory 220 may be a remote data store, e.g., a cloud-based storage location, communicatively coupled to system 200 over a network 204 via network interface 240. Network 204 can be any type of network or combination of networks used to communicate information between different computing devices. Network 204 can include, but is not limited to, a wired (e.g., Ethernet) or a wireless (e.g., Wi-Fi or mobile telecommunications) network. In addition, network 204 is can include, but is not limited to, a local area network, medium area network, and/or wide area network such as the Internet.

In one or more embodiments, well planner 210 includes a data manager 212, an inversion modeler 214, and a well path controller 216. It should be appreciated that well planner 210 and its components (including data manager 212, inversion modeler 214, and well path controller 216) may be implemented in software, firmware, hardware, or any combination thereof. Furthermore, it should be appreciated that embodiments of well planner 210, data manager 212, inversion modeler 214, and well path controller 216, or portions thereof, can be implemented to run on any type of processing device including, but not limited to, a computer, workstation, embedded system, networked device, mobile device, or other type of processor or computer system capable of carrying out the functionality described herein.

In one or more embodiments, data manager 212 may be used to obtain information relating to downhole operations being performed at a well site. The downhole operation may be a drilling operation for drilling a wellbore (e.g., wellbore 126 of FIG. 1A, as described above) along a planned path through different layers of a subsurface formation. Such information may include real-time measurements of formation properties collected by a downhole tool (e.g., downhole tool 132A of FIG. 1A, as described above) as the wellbore is drilled along the planned path. The downhole tool may be coupled to the bottom-hole assembly of a drill string (e.g., drill string 108 of FIG. 1A, as described above) disposed within the wellbore. In some implementations, the downhole tool may be an electromagnetic resistivity logging tool for measuring the resistivity of the surrounding formation, including in areas ahead of the tool (look-ahead) and/or surrounding the tool (look-around). The measurements may be collected over different logging points along the planned path of the wellbore. The measurements from the downhole tool may be stored within memory 220 as downhole data 222.

In one or more embodiments, inversion modeler 214 may predict a response of the downhole tool for different logging points along the planned path of the wellbore, based on each of a plurality of inversion models 224. As described above, each inversion model may be a multi-layer formation model generated by randomly sampling different sets of parameters such that the generated models cover all possible combinations of formation is properties for the multiple formation layers of interest. Such sampling may be performed using any of various statistical techniques, e.g., based on a pre-defined range of parameters within some probability distribution. The logging points may correspond to different depths or locations within a single layer or across multiple layers of the formation.

In one or more embodiments, inversion models 224 may be stored within memory 220 after being generated by inversion modeler 214 during the downhole operation, e.g., prior to reaching a logging point along a portion of the planned path during a current stage of the operation being performed. The predicted responses of the downhole tool based on each inversion model may be stored in memory 220 as predicted responses 226. Alternatively, inversion models 224 and/or predicted responses 226 may have been previously generated and stored in a remote database (DB) 250. Accordingly, inversion models 224 and predicted responses 226 in this example may have been retrieved by inversion modeler 214 from DB 250 via network interface 240 and network 204 and then stored within memory 220 for use during the downhole operation. DB 250 may be any remote data storage device or system used to store any of various types of information accessible to inversion modeler 214 and other components of well planner 210 via network 204 for performing the geosteering inversion techniques disclosed herein.

In one or more embodiments, inversion models 224 stored in memory 220 may represent an initial set of formation models from which a subset of models is selected for performing inversion during subsequent stages of the downhole operation. The selection of inversion models from the initial set may be based on a comparison between the predicted responses 226 associated with each of inversion models 224 and the downhole tool's actual responses at the corresponding logging points along the wellbore's path during the current stage of the downhole operation. The actual responses may be based on measurements of one or more formation properties (e.g., horizontal or vertical resistivity) obtained from the tool (and stored in memory 220 as downhole data 222).

In one or more embodiments, inversion modeler 214 may calculate a misfit value for each formation model in the initial set based on the comparison between actual responses of the downhole tool measured during the current stage of the downhole operation and the responses predicted using that formation model during a prior stage of the downhole operation. Inversion modeler 214 may then select a plurality of inversion models from among the formation models in the initial set, based on the misfit value calculated for each formation model and at least one misfit criterion. The misfit criterion may be, for example, a misfit threshold used to select only those initial models that produce a predicted response that matches or fits the actual response within a given error tolerance. As described above, the misfit threshold may represent a tolerable amount of deviation between the actual and predicted responses of the downhole tool. Thus, any formation model in the initial set having a misfit value above the misfit threshold may be disqualified and removed from the set of models selected for performing inversion. In addition to the misfit threshold, other misfit criteria may be used to qualify the set of initial models that are selected as inversion models for performing inversion during the downhole operation.

An example of another criterion, which may be used in conjunction with the misfit threshold, is resistivity contrast. Resistivity contrast may represent a gradient transition of formation resistivity between different formation layers. In the above example, each formation model in the initial set may be used to estimate or predict the resistivity contrast across different formation layers. The predicted resistivity contrast from each model may then be compared with prior information indicating the actual or known resistivity contrast between the formation layers. Such prior information may include, for example, actual resistivity values that were previously acquired for each formation layer by a downhole EM resistivity logging (or LWD) tool within a nearby offset well (or during a previous stage of the downhole operation in the current well). Resistivity contrast in this example may be used to select as inversion models only those initial models for which the comparison reveals predicted resistivity values that are consistent with (e.g., within a given error tolerance of) the actual or known resistivity values across the different formation layers. It should be appreciated that a similar comparison may be performed for predicted and actual resistivity values corresponding to one or more logging points within the same formation layer. It should also be appreciated that the measurements of actual formation resistivity may be acquired and compared with predicted resistivity values in real-time during the downhole operation along the path of the wellbore. Also, while the above example is described in the context of resistivity contrasts, it should be appreciated that the disclosed techniques may be applied to other relevant formation properties as desired for a particular implementation.

In one or more embodiments, inversion modeler 214 may use K-means clustering to cluster inversion models 224 or a selected subset of inversion models 224 qualified for performing inversion based on the comparison between actual and predicted tool responses, as described above. The clustering performed by inversion modeler 214 at this stage may be based on a randomly selected centroid for each cluster. The cluster centroids may be selected by, for example, first shuffling the dataset of predicted responses 226 produced by inversion models 224 and then randomly selecting a number of data points (predicted responses) equivalent to a desired number of clusters. Thus, the centroid for each cluster in this example may be an inversion model that corresponds to the randomly selected data point (predicted response) for that cluster. It should be appreciated that any number of clusters may be generated as desired for a particular implementation and that each cluster may include any number of inversion models. The size of each cluster may be dependent upon the number of clusters and the total number of data points (predicted responses 226) produced by inversion models 224. In some implementations, the number of clusters as well as the size (or size range based on a minimum and maximum size) for each cluster may be specified by user 202 via GUI 230.

In one or more embodiments, inversion modeler 214 may determine an average inversion model for each cluster and then iteratively re-cluster inversion models 224 (or selected subset thereof) using the average inversion model as the new centroid for that cluster. The average inversion model for each cluster may be determined based on, for example, a geometric average of the responses predicted using the inversion model(s) associated with that cluster, e.g., by taking the common logarithm ("logarithm base 10" or "$\log_{10}$") of the estimated or predicted horizontal resistivity for different points along the planned path of the wellbore.

Inversion modeler 214 may then select at least one of the re-clustered inversion models to perform inversion for one or more subsequent stages of the downhole operation along the planned path of the wellbore. The selection may be based on, for example, input from user 202 via GUI 230, e.g., user input selecting a particular inversion model from a list of options presented within GUI 230. Additionally or alternatively, inversion modeler 214 may use any of various selection criteria for selecting an appropriate inversion model, as is desired for a particular implementation. For example, inversion modeler 214 may use a quality criterion to assess the quality or accuracy of each cluster with respect to one or more inversion parameters of interest. The quality criterion may be, for example, a standard deviation between the actual tool responses and the predicted responses produced by the average inversion model (or centroid) of each cluster, where at least one of the inversion models of the cluster with the lowest standard deviation may be selected for performing the inversion. A similar quality or selection criterion may be used to assess the individual inversion models within a particular cluster to narrow the selection to a particular model with the lowest standard deviation between its predicted responses and the actual tool responses. It should be appreciated that the re-clustering process may be repeated over any number of iterations to minimize the standard deviation, e.g., until the standard deviation falls below a predetermined or user-specified error tolerance threshold.

In one or more embodiments, the results of the inversion performed by inversion modeler 214 (based on the iteratively clustered inversion models) may then be used by well path controller 216 to adjust or optimize the planned path of the wellbore. The one or more subsequent stages of the downhole operation may then be performed by steering the drill string or BHA thereof along the adjusted or optimized path of the wellbore. The results of the inversion performed using the selected model(s) may also be displayed to user 202 of system 200 via GUI 230. Additional details regarding the clustering of inversion models performed by inversion modeler 214 will be described below with respect to FIG. 3.

Figure 3:
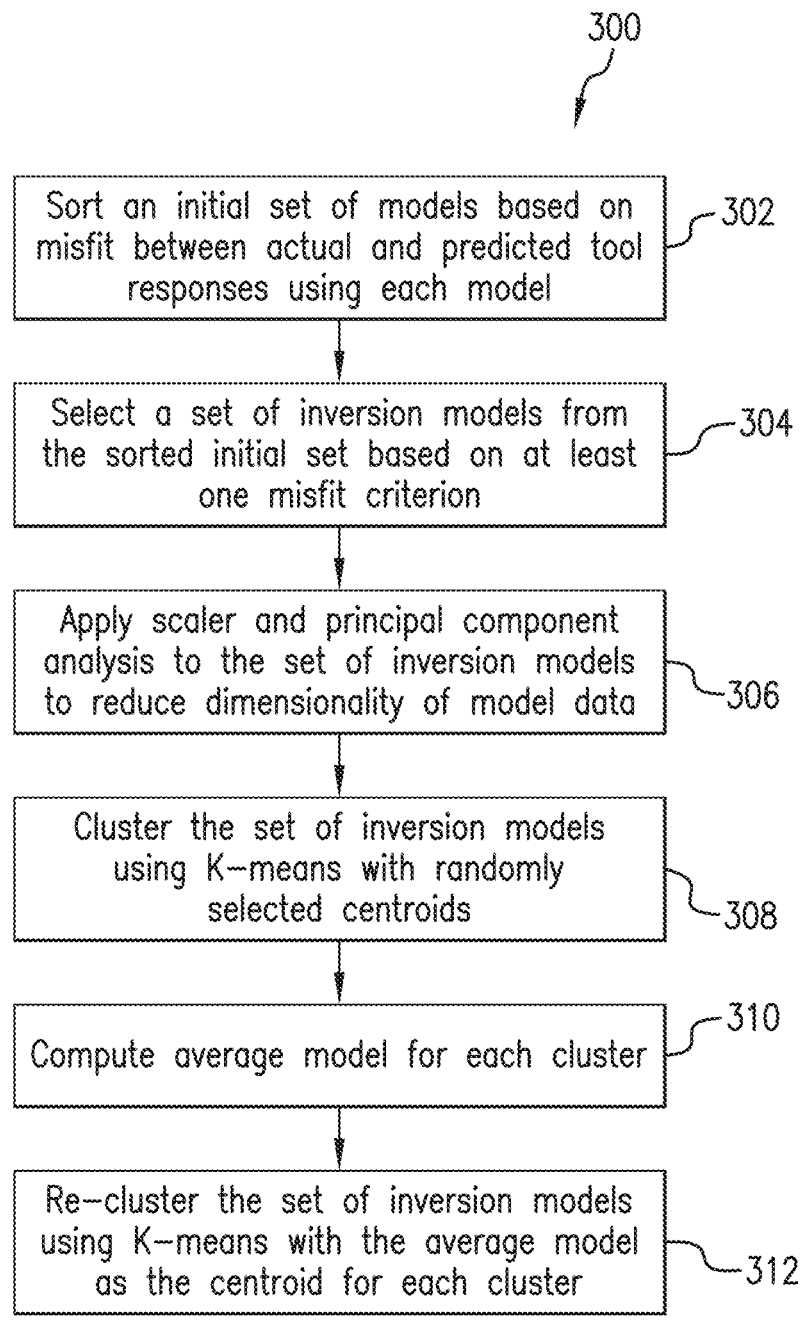
FIG. 3 is a flowchart of an illustrative process for iterative clustering of inversion models.

FIG. 3 is a flowchart of an illustrative process 300 for iterative clustering of inversion models. For discussion purposes, process 300 will be described with reference to drilling system 100A of FIG. 1A and system 200 of FIG. 2, as described above, but is not intended to be limited thereto. For example, process 300 may be implemented using inversion modeler 214 of well planner 210 in FIG. 2, as described above.

As shown in FIG. 3, process 300 begins in block 302, which includes sorting an initial set of formation models according to the degree of misfit between actual tool responses and predicted responses using each model. In one or more embodiments, the initial set of models may be multi-layer formation models that each represent a different number of formation layers (e.g., between three and nine formation layers). However, it should be appreciated that each model may represent any number of formation layers as is desired for a particular implementation. Each of the initial models may be generated by, for example, randomly sampling different sets of parameters for the formation layers being represented, e.g., based on a predefined range of parameters within some probability distribution. Accordingly, the initial set of models may represent multiple initial guesses of formation properties for multiple layers of the formation. The formation properties may include, for example and without limitation, resistivity values for different points along a planned path of a wellbore. The different points may correspond to different sections along a length of the wellbore or different depths over a depth range within the formation. In some implementations, the resistivity values may include, but are not limited to, a formation layer resistivity at the tool's current location, a look-ahead resistivity of the formation layer ahead of the current location, and a distance from the current location to the next formation layer ahead of the tool's current position (i.e., a distance to bed boundary or "DTBB"), or any combination of the foregoing.

In block 304, a set of inversion models may be selected from the sorted initial set of models based on at least one misfit criterion. In one or more embodiments, the misfit criterion may be a misfit error threshold representing a tolerable amount of misfit error, which serves as a cutoff for filtering out any initial models that produce resistivity estimates exceeding the tolerable amount of misfit. As described above, the models that are filtered out (or disqualified for inversion) may represent noise that can be discarded from the modeled dataset. In some implementations, a selection coefficient in the form of a multiplier or weighting factor may be applied to the misfit threshold to vary the cutoff as desired for a particular implementation. Additionally, a minimum percentage criterion may be used to ensure that a sufficient number of inversion models are selected from the initial set. For example, the minimum percentage criterion may require that some percentage (e.g., at least 68%) of the initial models be selected for performing inversion. If the number of models that are selected based on the misfit criterion relative to the total number of initial models is below the minimum percentage criterion, additional models may be selected from the initial set until the minimum percentage criterion is satisfied. It should be appreciated that any of various approaches may be used to select additional models, if required, from the initial set, e.g., using random selection, any of various statistical techniques, or based on user input or manual selection. Values of the misfit threshold, selection coefficient, and/or minimum is percentage criterion may be predetermined or specified by a user, e.g., user 202 via GUI 230 of system 200 of FIG. 2, as described above.

Figure 4A:
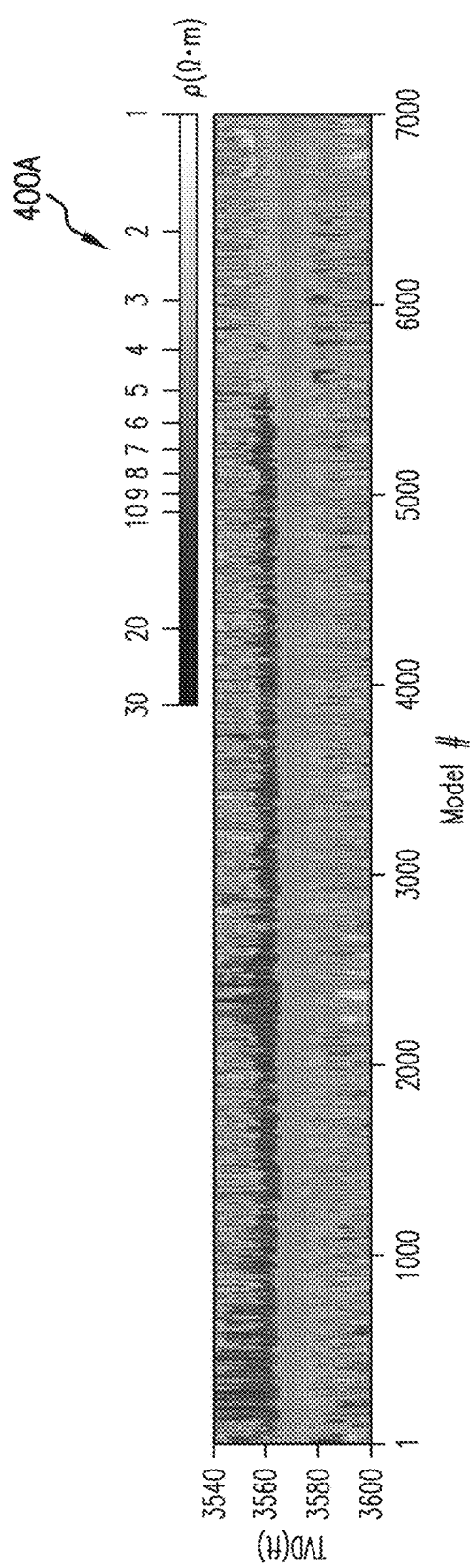
FIG. 4A is a plot of electromagnetic (EM) resistivity values estimated using an initial set of formation models.
Figure 4B:
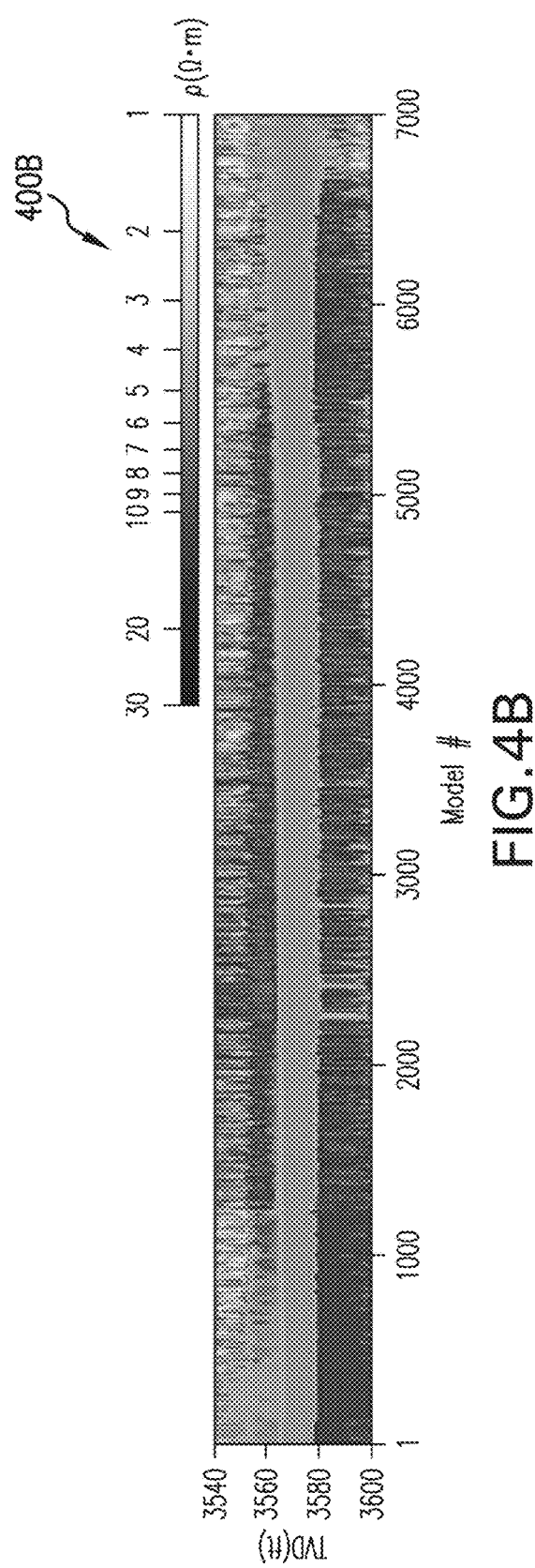
FIG. 4B is a plot of inversion results corresponding to the initial set of models in FIG. 4A.
Figure 4C:
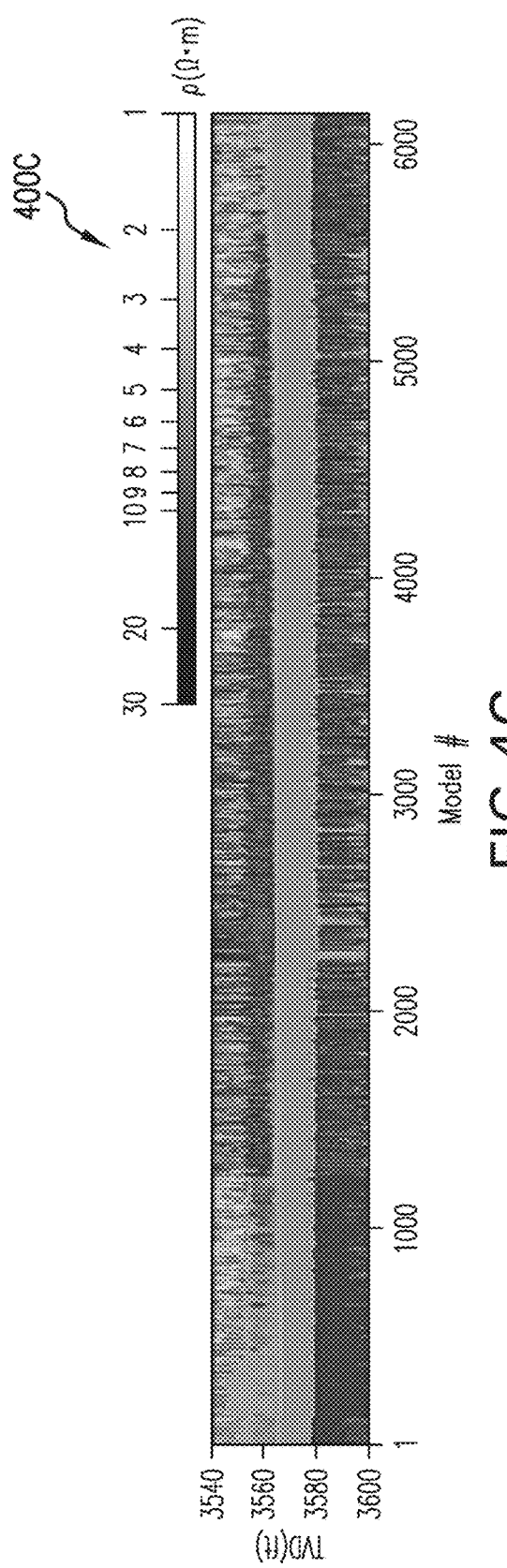
FIG. 4C is a plot of inversion results produced by a set of inversion models selected from the initial set of models in FIG. 4A.
Figure 4D:
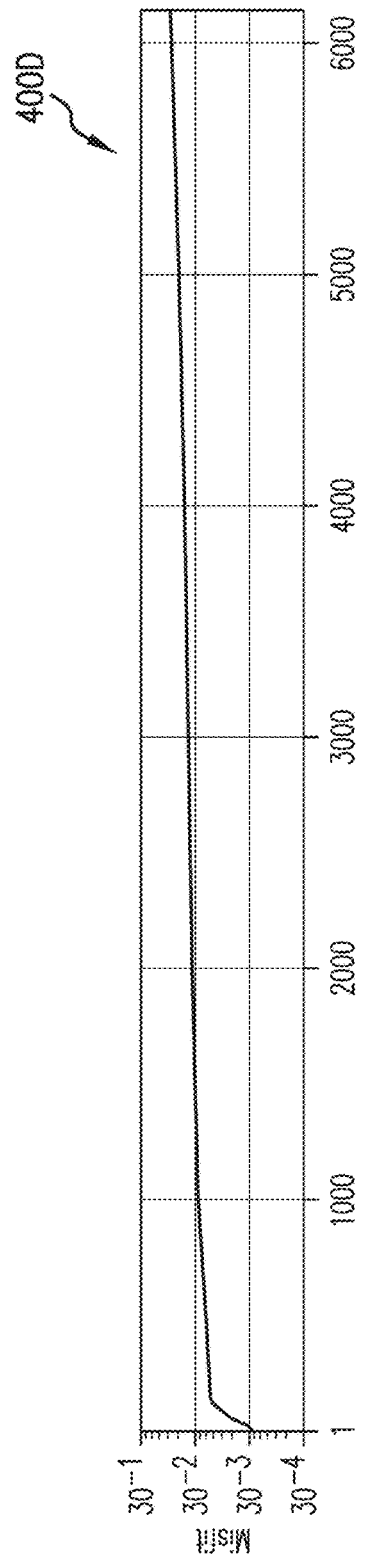
FIG. 4D is a plot of the misfit between resistivity values measured by a downhole tool and those estimated using the set of inversion models in FIG. 4C.

FIG. 4A is a plot 400A that shows values of electromagnetic (EM) resistivity (p) estimated using an initial set of formation models (e.g., a total of 7,000 models) for different formation points (e.g., different formation layers at varying depths or True Vertical Depth ("TVD") in feet) along a planned path of the wellbore. FIG. 4B is a plot 400B of inversion results corresponding to the initial set of models in FIG. 4A. FIG. 4C is a plot 400C of inversion results corresponding to a set of inversion models selected from the initial set of models in FIG. 4A. The inversion models (e.g., a total of 6,500 models) in FIG. 4C may have been selected from the initial set based on a predetermined or user-specified misfit criterion and a minimum percentage criterion, as described above. In some implementations, the misfit criterion may be determined by multiplying a selection coefficient (e.g., 50) with a predetermined or user-specified misfit threshold (e.g., 50× misfit threshold). FIG. 4D is a plot 400D of the misfit between resistivity values measured by a downhole tool (e.g., downhole tool 132A of FIG. 1A, as described above) and those estimated using the set of inversion models in FIG. 4C. While the plots in FIGS. 4A-4D (and FIGS. 5A-6C, which will be described in further detail below) show a distribution of resistivity values (e.g., as shaded bars representing a range of resistivity (p) in units of ohm-meter (nm) from 1 to 30) over a depth range (e.g., between 3540 and 3600 feet) for either a total of 7,000 models (e.g., indexed or numbered from 1 to 7000) in FIGS. 4A and 4B or a total of 6,500 models in FIGS. 4C-6C, it should be appreciated that embodiments of the present disclosure are not intended to be limited thereto and that any number of inversion models for estimating any of various formation properties measurable over any of various measurement ranges may be used as desired for a particular implementation. It should also be appreciated that such models may be used to predict any of various formation properties for different points (e.g., points at the same depth along a planned well path) within a formation. It is assumed for purposes of the examples shown in FIGS. 4A-6C that the models and their corresponding resistivity values in each plot have been sorted from left to right in order of increasing misfit error, e.g., based on actual measurements collected by a downhole tool.

Referring back to FIG. 3, process 300 may optionally proceed to block 306, which includes applying standard scaler and principal component analysis functions to the set of inversion models to reduce the dimensionality of model data. Alternatively, process 300 may proceed directly to block 308, which includes clustering the set of inversion models selected in block 304 using K-means clustering to produce a predetermined or user-specified number of clusters with a randomly selected centroid for each cluster.

In block 310, an average model for each cluster of inversion models may be computed. As described above, the average inversion model for each cluster may be determined based on, for example, a geometric average of the downhole tool (e.g., EM logging tool) responses predicted using the inversion model(s) associated with that cluster, e.g., by taking the common logarithm ("logarithm base 10" or "$\log_{10}$") of the estimated or predicted horizontal resistivity for different points along the planned path of the wellbore.

In block 312, the set of inversion models are re-clustered using a modified K-means clustering approach in which the average model computed for each cluster is used as the centroid for that cluster.

Figure 5C:
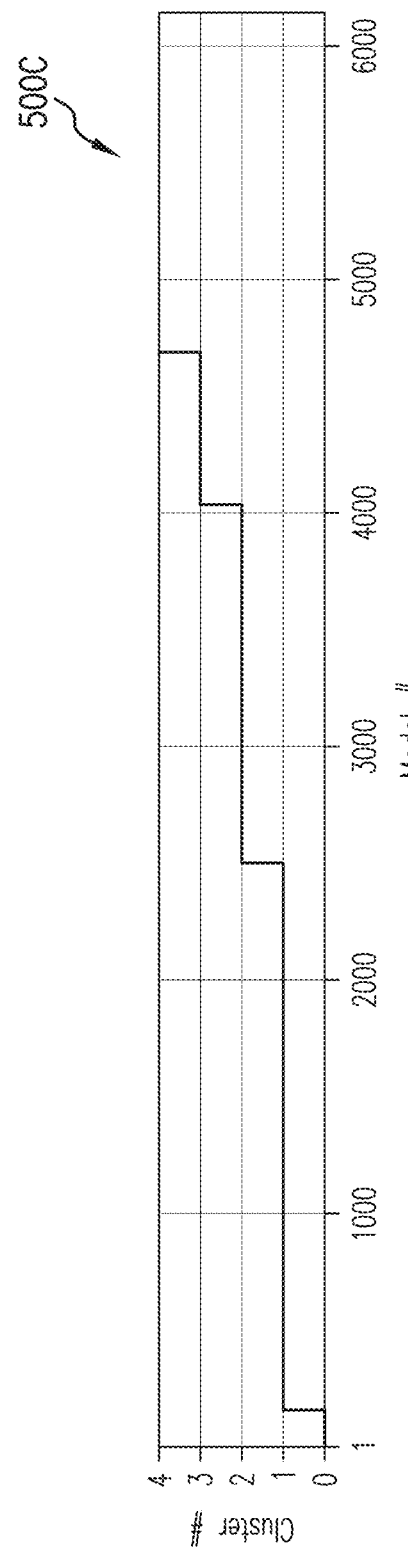
FIG. 5C is a plot of cluster numbers to which the corresponding inversion models of FIG. 5B are assigned.

FIG. 5A is a plot 500A of inversion results produced by the inversion models of FIG. 4C after applying K-means clustering (e.g., in block 308 of FIG. 3). FIG. 5B is a plot 500B of computed averages (e.g., block 310 of FIG. 3) of the inversion results for each cluster of FIG. 5A. FIG. 5C is a plot 500C of cluster numbers to which the corresponding inversion models of FIG. 5B are assigned in this example.

Figure 6A:
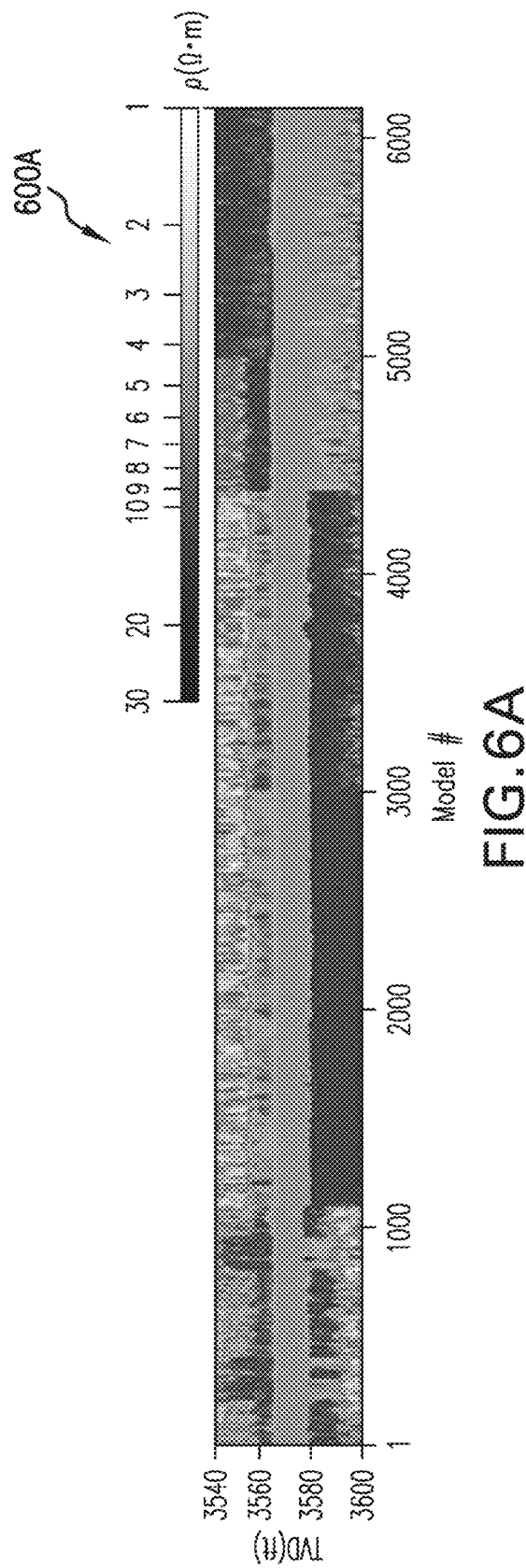
FIG. 6A is a plot of inversion results for the inversion models after applying a modified K-means clustering approach to re-cluster the inversion models using the computed averages from FIG. 5B as the cluster centroids.
Figure 6B:
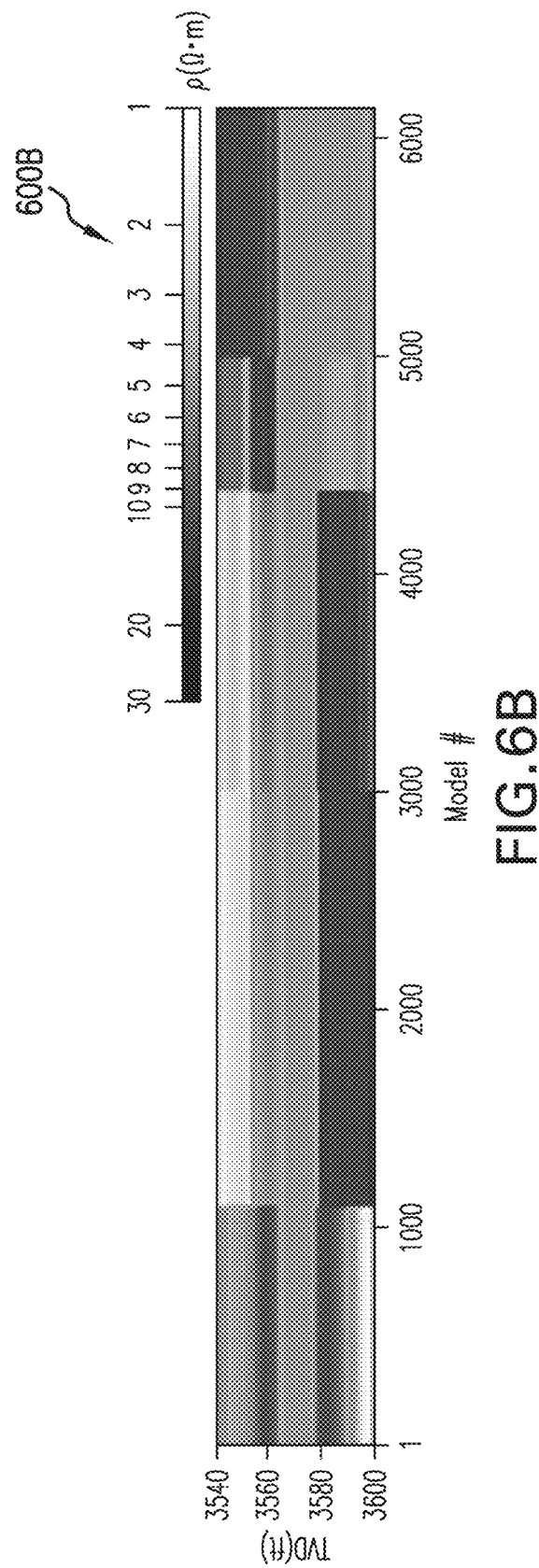
FIG. 6B is a plot of computed averages of the inversion results for the re-clustered inversion models in FIG. 6A.
Figure 6C:
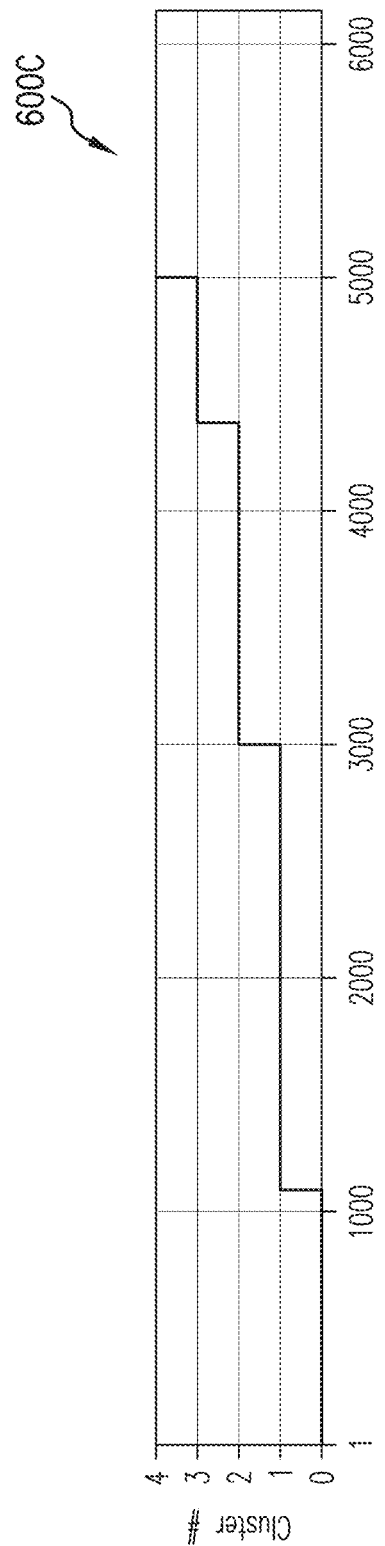
FIG. 6C is a plot of cluster numbers to which the corresponding inversion models of FIG. 6B are assigned.

FIG. 6A is a plot 600A of inversion results for the inversion models after applying the modified K-means clustering approach (e.g., in block 312 of FIG. 3) to re-cluster the inversion models using the computed averages from FIG. 5B as the cluster centroids. FIG. 6B is a plot 600B of computed averages of the inversion results for the re-clustered inversion models in FIG. 6A. FIG. 6C is a plot 600C of cluster numbers to which the corresponding inversion models of FIG. 6B may be assigned.

Figure 7:
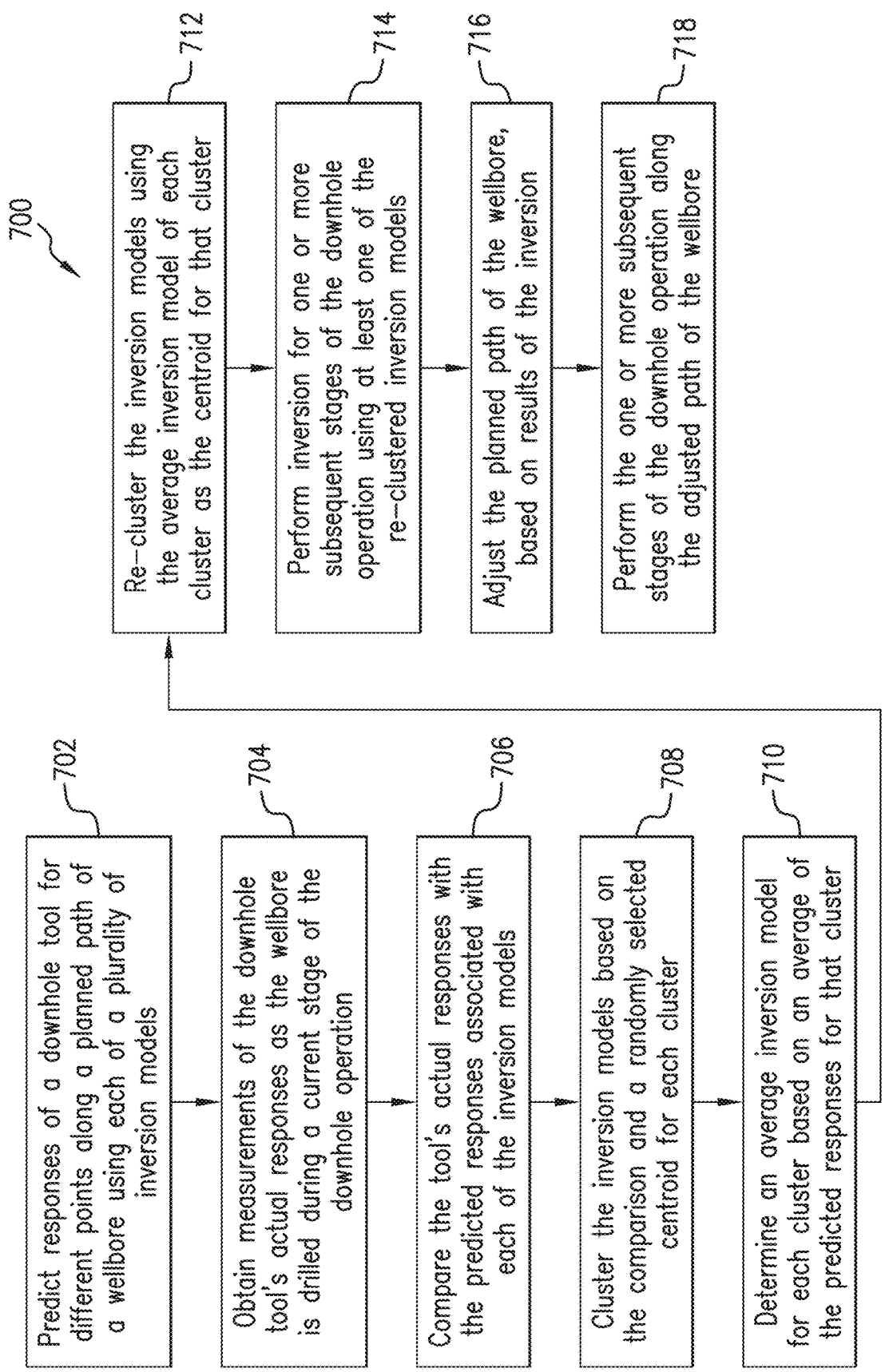
FIG. 7 is a flowchart of an illustrative process for iterative clustering of inversion models for geosteering inversion during a downhole operation along a wellbore.

FIG. 7 is a flowchart of an illustrative process 700 for iterative clustering of inversion models, e.g., for purposes of geosteering inversion during a downhole operation along a wellbore. For discussion purposes, process 700 will be described using drilling system 100A of FIG. 1A and system 200 of FIG. 2, as described above. However, process 700 is not intended to be limited thereto.

As shown in FIG. 7, process 700 begins in block 702, which includes predicting responses of a downhole tool (e.g., downhole tool 132A of FIG. 1A, as described above) for different points along a planned path of a wellbore to be drilled through a subsurface formation over different stages of a downhole operation, based on each of a plurality of inversion models. As described above, the plurality of inversion models may be selected from an initial set of formation models. The initial models may be generated by, for example, randomly sampling different sets of parameters representing different formation properties based on pre-defined parameter ranges within a probability distribution associated with the subsurface formation.

In block 704, measurements of the downhole tool's actual responses may be obtained as the wellbore is drilled over the different points along the planned path during a current stage of the downhole operation.

In block 706, the tool's actual responses are compared with the predicted responses associated with each of the inversion models.

Process 700 then proceeds to block 708, which includes clustering the inversion models, e.g., using K-means clustering, based on the comparison in block 706 and a randomly selected centroid for each cluster.

In block 710, an average inversion model is determined for each cluster based on an average of the predicted responses for that cluster. The inversion models may then be re-clustered in block 712 using the average inversion model determined for each cluster in block 710 as the (new) centroid for that cluster.

At least one of the re-clustered inversion models may then be selected in block 714 to perform inversion for one or more subsequent stages of the downhole operation. As described above, the inversion model may be selected from the re-clustered set of inversion models based on at least one selection criterion. The selection criterion may be any quality factor that can be used to assess the quality or accuracy of each initial model with respect to one or more inversion parameters of interest. Such a selection criterion may be, for example, a standard deviation between the actual tool responses and the predicted responses associated with each cluster of inversion models, where the average model of the cluster with the lowest standard deviation may be selected for performing the inversion.

In block 716, the planned path of the wellbore may be adjusted based on results of the inversion, and the one or more subsequent stages of the downhole operation may then be performed in block 718 along the adjusted path of the wellbore. In one or more embodiments, the downhole tool in this example may be coupled to a bottom hole assembly of a drill string disposed within the wellbore. Accordingly, the planned path of the wellbore may be adjusted in block 716 by adjusting one or more operating parameters of the bottom hole assembly for steering the wellbore as it is drilled through the subsurface formation during the one or more subsequent stages of the downhole operation.

FIG. 8 is a block diagram of an illustrative computer system 800 in which embodiments of the present disclosure may be implemented. For example, processes 300 and 700 of FIGS. 3 and 7, respectively, as described above, as well as system 200 of FIG. 2 may be implemented using system 800. System 800 may be a desktop or personal computer, smartphone, tablet, or any other type of electronic device. Such an electronic device includes various types of computer readable media and interfaces for various other types of computer readable media. As shown in FIG. 8, system 800 includes a permanent storage device 802, a system memory 804, an output device interface 806, a system communications bus 808, a read-only memory (ROM) 810, processing unit(s) 812, an input device interface 814, and a network interface 816.

Bus 808 collectively represents all system, peripheral, and chipset buses that communicatively connect the numerous internal devices of system 800. For instance, bus 808 communicatively connects processing unit(s) 812 with ROM 810, system memory 804, and permanent storage device 802.

From these various memory units, processing unit(s) 812 retrieves instructions to execute and data to process in order to execute the processes of the subject disclosure. The processing unit(s) can be a single processor or a multi-core processor in different implementations.

ROM 810 stores static data and instructions that are needed by processing unit(s) 812 and other modules of system 800. Permanent storage device 802, on the other hand, is a read-and-write memory device. This device is a non-volatile memory unit that stores instructions and data even when system 800 is off. Some implementations of the subject disclosure use a mass-storage device (such as a magnetic or optical disk and its corresponding disk drive) as permanent storage device 802.

Other implementations use a removable storage device (such as a floppy disk, flash drive, and its corresponding disk drive) as permanent storage device 802. Like permanent storage device 802, system memory 804 is a read-and-write memory device. However, unlike storage device 802, system memory 804 is a volatile read-and-write memory, such a random access memory. System memory 804 stores some of the instructions and data that the processor needs at runtime. In some implementations, the processes of the subject disclosure are stored in system memory 804, permanent storage device 802, and/or ROM 810. For example, the various memory units include instructions for computer aided pipe string design based on existing string designs in accordance with some implementations. From these various memory units, processing unit(s) 812 retrieves instructions to execute and data to process in order to execute the processes of some implementations.

Bus 808 also connects to input and output device interfaces 814 and 806. Input device interface 814 enables the user to communicate information and select commands to the system 800. Input devices used with input device interface 814 include, for example, alphanumeric, QWERTY, or T9 keyboards, microphones, and pointing devices (also called "cursor control devices"). Output device interfaces 806 enables, for example, the display of images generated by the system 800. Output devices used with output device interface 806 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 8, bus 808 also couples system 800 to a public or private network (not shown) or combination of networks through a network interface 816. Such a network may include, for example, a local area network ("LAN"), such as an Intranet, or a wide area network ("WAN"), such as the Internet. Any or all components of system 800 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core is processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, instructions for performing processes 300 and 700 of FIGS. 3 and 7, respectively, as described above, may be implemented using system 800 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for geosteering inversion using a modified K-means clustering technique. Relative to conventional inversion technique, the disclosed techniques may provide more accurate results with relatively less error in the clustering process for the inversion models. The average inversion model used in the modified K-means clustering technique disclosed herein serves as a better centroid than one that is randomly selected and thus, enhances the convergency of the clustering results to produce a better clustering result overall.

In an embodiment of the present disclosure, a computer-implemented method of geosteering inversion includes: predicting responses of a downhole tool for different points along a planned path of a wellbore to be drilled through a subsurface formation over different stages of a downhole operation, based on each of a plurality of inversion models representing different layers of the subsurface formation; obtaining measurements of the downhole tool's actual responses as the wellbore is drilled over the different points along the planned path through the subsurface formation during a current stage of the downhole operation; is comparing the actual responses of the downhole tool with the predicted responses associated with each of the plurality of inversion models; clustering the plurality of inversion models into clusters of inversion models based on the comparison and a randomly selected centroid for each of the clusters; determining an average inversion model for each of the clusters, based on an average of the responses predicted by one or more of the inversion models associated with that cluster; re-clustering the plurality of inversion models using the average inversion model determined for each cluster as the centroid for that cluster; performing inversion for one or more subsequent stages of the downhole operation along the planned path of the wellbore using at least one of the re-clustered inversion models; and adjusting the planned path of the wellbore for the one or more subsequent stages of the downhole operation, based on results of the inversion performed using the selected inversion model. In another embodiment, a computer-readable storage medium includes instructions stored therein, where the instructions, when executed by a computer, cause the computer to perform a plurality of functions, including functions to: predict responses of a downhole tool for different points along a planned path of a wellbore to be drilled through a subsurface formation over different stages of a downhole operation, based on each of a plurality of inversion models representing different layers of the subsurface formation; obtain measurements of the downhole tool's actual responses as the wellbore is drilled over the different points along the planned path through the subsurface formation during a current stage of the downhole operation; compare the actual responses of the downhole tool with the predicted responses associated with each of the plurality of inversion models; cluster the plurality of inversion models into clusters of inversion models based on the comparison and a randomly selected centroid for each of the clusters; determine an average inversion model for each of the clusters, based on an average of the responses predicted by one or more of the inversion models associated with that cluster; re-cluster the plurality of inversion models using the average inversion model determined for each cluster as the centroid for that cluster; perform inversion for one or more subsequent stages of the downhole operation along the planned path of the wellbore using at least one of the re-clustered inversion models; and adjust the planned path of the wellbore for the one or more subsequent stages of the downhole operation, based on results of the inversion performed using the selected inversion model.

Embodiments of the foregoing method and computer-readable storage medium may include any one of the following functions, operations or elements, alone or in is combination with each other: selecting at least one of the re-clustered inversion models for performing the inversion based on a selection criterion; the selection criterion is a standard deviation between the actual responses and the predicted responses of the downhole tool; the plurality of inversion models is selected from an initial set of formation models, each formation model in the set represents a different set of formation properties, and the functions, operations or elements further include randomly sampling different sets of model parameters representing different formation properties, based on predefined parameter ranges within a probability distribution associated with the subsurface formation, and generating the initial set of formation models based on the randomly sampled sets of model parameters; calculating a misfit value for each formation model in the initial set based on a comparison between actual responses of the downhole tool measured during the current stage of the downhole operation and responses predicted using that formation model during a prior stage of the downhole operation, and selecting the plurality of inversion models from among the formation models in the initial set based on the misfit value calculated for each formation model in the initial set; the selected plurality of inversion models includes each formation model in the initial set for which the calculated misfit value meets at least one misfit criterion; the misfit criterion is a misfit threshold representing an acceptable amount of deviation between the actual and predicted responses of the downhole tool, and selecting the plurality of inversion models comprises sorting the initial set of formation models according to the misfit value calculated for each formation model, identifying formation models in the initial set for which corresponding misfit values fall below the misfit threshold, based on the sorting, and selecting the identified formation models from the initial set as the plurality of inversion model; the downhole tool is coupled to a bottom hole assembly of a drill string disposed within the wellbore, and adjusting the planned path of the wellbore comprises adjusting one or more operating parameters of the bottom hole assembly for steering the wellbore as it is drilled through the subsurface formation during the one or more subsequent stages of the downhole operation; the downhole tool is an electromagnetic resistivity tool that measures formation resistivity, and the predicted and actual responses of the downhole tool are formation resistivity values; and the formation resistivity values may be selected from the group consisting of: a resistivity of a first formation layer, a resistivity of each of one or more second formation layers ahead of the first formation layer, a distance between the first formation layer and the one or more second formation layers, and a resistivity contrast representing a gradient transition of formation resistivity between the first and one or more second formation layers.

In a further embodiment, a system includes a processor and a memory coupled to the processor that has instructions stored therein, which, when executed by the processor, cause the processor to perform a plurality of functions, including functions to: predict responses of a downhole tool for different points along a planned path of a wellbore to be drilled through a subsurface formation over different stages of a downhole operation, based on each of a plurality of inversion models representing different layers of the subsurface formation; obtain measurements of the downhole tool's actual responses as the wellbore is drilled over the different points along the planned path through the subsurface formation during a current stage of the downhole operation; compare the actual responses of the downhole tool with the predicted responses associated with each of the plurality of inversion models; cluster the plurality of inversion models into clusters of inversion models based on the comparison and a randomly selected centroid for each of the clusters; determine an average inversion model for each of the clusters, based on an average of the responses predicted by one or more of the inversion models associated with that cluster; re-cluster the plurality of inversion models using the average inversion model determined for each cluster as the centroid for that cluster; perform inversion for one or more subsequent stages of the downhole operation along the planned path of the wellbore using at least one of the re-clustered inversion models; and adjust the planned path of the wellbore for the one or more subsequent stages of the downhole operation, based on results of the inversion performed using the selected inversion model.

Embodiments of the foregoing system may include any one of the following functions, operations or elements, alone or in combination with each other: selecting at least one of the re-clustered inversion models for performing the inversion based on a selection criterion; the selection criterion is a standard deviation between the actual responses and the predicted responses of the downhole tool; the plurality of inversion models is selected from an initial set of formation models, each formation model in the set represents a different set of formation properties, and the functions performed by the processor further include randomly sampling different sets of model parameters representing different formation properties, based on predefined parameter ranges within a probability distribution associated with the subsurface formation, and generating the initial set of formation models based on the randomly sampled sets of model parameters; calculating a misfit value for each formation model in the initial set based on a comparison between actual responses of the downhole tool measured during the current stage of the downhole operation and responses predicted using that formation model during a prior stage of the downhole operation, and selecting the plurality of inversion models from among the formation models in the initial set based on the misfit value calculated for each formation model in the initial set; the selected plurality of inversion models includes each formation model in the initial set for which the calculated misfit value meets at least one misfit criterion; the misfit criterion is a misfit threshold representing an acceptable amount of deviation between the actual and predicted responses of the downhole tool, and selecting the plurality of inversion models comprises sorting the initial set of formation models according to the misfit value calculated for each formation model, identifying formation models in the initial set for which corresponding misfit values fall below the misfit threshold, based on the sorting, and selecting the identified formation models from the initial set as the plurality of inversion model; the downhole tool is coupled to a bottom hole assembly of a drill string disposed within the wellbore, and adjusting the planned path of the wellbore comprises adjusting one or more operating parameters of the bottom hole assembly for steering the wellbore as it is drilled through the subsurface formation during the one or more subsequent stages of the downhole operation; the downhole tool is an electromagnetic resistivity tool that measures formation resistivity, and the predicted and actual responses of the downhole tool are formation resistivity values; and the formation resistivity values may be selected from the group consisting of: a resistivity of a first formation layer, a resistivity of each of one or more second formation layers ahead of the first formation layer, a distance between the first formation layer and the one or more second formation layers, and a resistivity contrast representing a gradient transition of formation resistivity between the first and one or more second formation layers.

While specific details about the above embodiments have been described, the above hardware and software descriptions are intended merely as example embodiments and are not intended to limit the structure or implementation of the disclosed embodiments. For instance, although many other internal components of the system 800 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and explanation but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method of geosteering inversion, the method comprising:
   predicting responses of a downhole tool for different points along a planned path of a wellbore to be drilled through a subsurface formation over different stages of a downhole operation, based on each of a plurality of inversion models representing different layers of the subsurface formation;
   obtaining measurements of the downhole tool's actual responses as the wellbore is drilled over the different points along the planned path through the subsurface formation during a current stage of the downhole operation;
   comparing the actual responses of the downhole tool with the predicted responses associated with each of the plurality of inversion models;
   clustering the plurality of inversion models into clusters of inversion models based on the comparison and a randomly selected centroid for each of the clusters;
   determining an average inversion model for each of the clusters, based on an average of the responses predicted by one or more of the inversion models associated with that cluster;
   re-clustering the plurality of inversion models using the average inversion model determined for each cluster as the centroid for that cluster;
   performing inversion for one or more subsequent stages of the downhole operation along the planned path of the wellbore using at least one of the re-clustered inversion models; and
   adjusting the planned path of the wellbore for the one or more subsequent stages of the downhole operation, based on results of the inversion performed using the selected inversion model.

2. The method of claim 1, further comprising:
   selecting at least one of the re-clustered inversion models for performing the inversion based on a selection criterion.

3. The method of claim 2, wherein the selection criterion is a standard deviation between the actual responses and the predicted responses of the downhole tool.

4. The method of claim 1, wherein the plurality of inversion models is selected from an initial set of formation models, each formation model in the set representing a different set of formation properties, and the method further comprises:
   randomly sampling different sets of model parameters representing different formation properties, based on predefined parameter ranges within a probability distribution associated with the subsurface formation; and
   generating the initial set of formation models based on the randomly sampled sets of model parameters.

5. The method of claim 4, wherein comparing comprises:
   calculating a misfit value for each formation model in the initial set based on a comparison between actual responses of the downhole tool measured during the current stage of the downhole operation and responses predicted using that formation model during a prior stage of the downhole operation; and
   selecting the plurality of inversion models from among the formation models in the initial set, based on the misfit value calculated for each formation model in the initial set.

6. The method of claim 5, wherein the selected plurality of inversion models includes each formation model in the initial set for which the calculated misfit value meets at least one misfit criterion.

7. The method of claim 6, wherein the misfit criterion is a misfit threshold representing an acceptable amount of deviation between the actual and predicted responses of the downhole tool, and selecting the plurality of inversion models comprises:
   sorting the initial set of formation models according to the misfit value calculated for each formation model;
   identifying formation models in the initial set for which corresponding misfit values fall below the misfit threshold, based on the sorting; and
   selecting the identified formation models from the initial set as the plurality of inversion models.

8. The method of claim 1, wherein the downhole tool is coupled to a bottom hole assembly of a drill string disposed within the wellbore, and adjusting the planned path of the wellbore comprises:
   adjusting one or more operating parameters of the bottom hole assembly for steering the wellbore as it is drilled through the subsurface formation during the one or more subsequent stages of the downhole operation.

9. The method of claim 1, wherein the downhole tool is an electromagnetic resistivity tool that measures formation resistivity, and the predicted and actual responses of the downhole tool are formation resistivity values.

10. The method of claim 9, wherein the formation resistivity values are selected from the group consisting of: a resistivity of a first formation layer, a resistivity of each of one or more second formation layers ahead of the first formation layer, a distance between the first formation layer and the one or more second formation layers, and a resistivity contrast representing a gradient transition of formation resistivity between the first and one or more second formation layers.

11. A system comprising:
a processor; and
a memory coupled to the processor having instructions stored therein, which, when executed by the processor, cause the processor to perform a plurality of functions, including functions to:
predict responses of a downhole tool for different points along a planned path of a wellbore to be drilled through a subsurface formation over different stages of a downhole operation, based on each of a plurality of inversion models representing different layers of the subsurface formation;
obtain measurements of the downhole tool's actual responses as the wellbore is drilled over the different points along the planned path through the subsurface formation during a current stage of the downhole operation;
compare the actual responses of the downhole tool with the predicted responses associated with each of the plurality of inversion models;
cluster the plurality of inversion models into clusters of inversion models based on the comparison and a randomly selected centroid for each of the clusters;
determine an average inversion model for each of the clusters, based on an average of the responses predicted by one or more of the inversion models associated with that cluster;
re-cluster the plurality of inversion models using the average inversion model determined for each cluster as the centroid for that cluster;
perform inversion for one or more subsequent stages of the downhole operation along the planned path of the wellbore using at least one of the re-clustered inversion models; and
adjust the planned path of the wellbore for the one or more subsequent stages of the downhole operation, based on results of the inversion performed using the selected inversion model.

12. The system of claim 11, wherein the functions performed by the processor further include functions to:
select at least one of the re-clustered inversion models for performing the inversion based on a selection criterion.

13. The system of claim 11, wherein the plurality of inversion models is selected from an initial set of formation models, each formation model in the set representing a different set of formation parameters, and the functions performed by the processor further include functions to:
randomly sample different sets of model parameters representing different formation properties, based on predefined parameter ranges within a probability distribution associated with the subsurface formation; and
generate the initial set of formation models based on the randomly sampled sets of model parameters.

14. The system of claim 13, wherein the functions performed by the processor further include functions to:
calculate a misfit value for each formation model in the initial set based on a comparison between actual responses of the downhole tool measured during the current stage of the downhole operation and responses predicted using that formation model during a prior stage of the downhole operation; and
select the plurality of inversion models from among the formation models in the initial set, based on the misfit value calculated for each formation model in the initial set.

15. The system of claim 14, wherein the selected plurality of inversion models includes each formation model in the initial set for which the calculated misfit value meets at least one misfit criterion.

16. The system of claim 15, wherein the misfit criterion is a misfit threshold representing an acceptable amount of deviation between the actual and predicted responses of the downhole tool, and the functions performed by the processor further include functions to:
sort the initial set of formation models according to the misfit value calculated for each formation model;
identify formation models in the initial set for which corresponding misfit values fall below the misfit threshold, based on the sorting; and
select the identified formation models from the initial set as the plurality of inversion models.

17. The system of claim 11, wherein the downhole tool is coupled to a bottom hole assembly of a drill string disposed within the wellbore, and the functions performed by the processor further include functions to:
adjust one or more operating parameters of the bottom hole assembly for steering the wellbore as it is drilled through the subsurface formation during the one or more subsequent stages of the downhole operation.

18. The system of claim 11, wherein the downhole tool is an electromagnetic resistivity tool that measures formation resistivity, and the predicted and actual responses of the downhole tool are formation resistivity values.

19. The system of claim 18, wherein the formation resistivity values are selected from the group consisting of: a resistivity of a first formation layer, a resistivity of each of one or more second formation layers ahead of the first formation layer, a distance between the first formation layer and the one or more second formation layers, and a resistivity contrast representing a gradient transition of formation resistivity between the first and one or more second formation layers.

20. A non-transitory computer-readable storage medium having instructions stored therein, which, when executed by a computer, cause the computer to perform a plurality of functions, including functions to:
predict responses of a downhole tool for different points along a planned path of a wellbore to be drilled through a subsurface formation over different stages of a downhole operation, based on each of a plurality of inversion models representing different layers of the subsurface formation;
obtain measurements of the downhole tool's actual responses as the wellbore is drilled over the different points along the planned path through the subsurface formation during a current stage of the downhole operation;

compare the actual responses of the downhole tool with the predicted responses associated with each of the plurality of inversion models;

cluster the plurality of inversion models into clusters of inversion models based on the comparison and a randomly selected centroid for each of the clusters;

determine an average inversion model for each of the clusters, based on an average of the responses predicted by one or more of the inversion models associated with that cluster;

re-cluster the plurality of inversion models using the average inversion model determined for each cluster as the centroid for that cluster;

perform inversion for one or more subsequent stages of the downhole operation along the planned path of the wellbore using at least one of the re-clustered inversion models; and adjust the planned path of the wellbore for the one or more subsequent stages of the downhole operation, based on results of the inversion performed using the selected inversion model.

* * * * *